(12) United States Patent
Dixit et al.

(10) Patent No.: US 11,086,182 B2
(45) Date of Patent: Aug. 10, 2021

(54) NARROW PRE-DEPOSITION LASER DELETION

(71) Applicant: View, Inc., Milpitas, CA (US)

(72) Inventors: Abhishek Anant Dixit, Collierville, TN (US); Todd William Martin, Mountain View, CA (US); Anshu A. Pradhan, Collierville, TN (US)

(73) Assignee: View, Inc., Milpitas, CA (US)

( * ) Notice: Subject to any disclaimer, the term of this patent is extended or adjusted under 35 U.S.C. 154(b) by 163 days.

(21) Appl. No.: 16/195,693

(22) Filed: Nov. 19, 2018

(65) Prior Publication Data

US 2019/0086756 A1    Mar. 21, 2019

Related U.S. Application Data

(63) Continuation of application No. 15/390,421, filed on Dec. 23, 2016, now Pat. No. 10,295,880, which is a (Continued)

(51) Int. Cl.
| | |
|---|---|
| *G02F 1/1524* | (2019.01) |
| *G02F 1/1333* | (2006.01) |
| *B32B 17/10* | (2006.01) |
| *G02F 1/153* | (2006.01) |
| *B32B 37/14* | (2006.01) |

(Continued)

(52) U.S. Cl.
CPC .......... *G02F 1/1524* (2019.01); *B32B 17/1099* (2013.01); *B32B 17/10119* (2013.01); *B32B 17/10513* (2013.01); *B32B 37/14* (2013.01); *B32B 38/10* (2013.01); *B32B 38/105* (2013.01); *G02F 1/1333* (2013.01); *G02F 1/1533* (2013.01); *G02F 1/153* (2013.01); *G02F 1/155* (2013.01); *G02F 2001/133302* (2013.01); *G02F 2001/1536* (2013.01); *G02F 2201/56* (2013.01);

(Continued)

(58) Field of Classification Search
CPC ...... G02F 1/155; B32B 17/1099; B32B 38/10; B32B 38/105; Y10T 156/1052
See application file for complete search history.

(56) References Cited

U.S. PATENT DOCUMENTS

| | | | |
|---|---|---|---|
| 4,854,675 A | 8/1989 | Yamazaki et al. | |
| 4,950,888 A | 8/1990 | Hamada | |

(Continued)

FOREIGN PATENT DOCUMENTS

| | | |
|---|---|---|
| CN | 1350326 A | 5/2002 |
| CN | 1482509 A | 3/2004 |

(Continued)

OTHER PUBLICATIONS

US Office Action dated Oct. 31, 2018 for U.S. Appl. No. 14/884,683.

(Continued)

*Primary Examiner* — Carson Gross
(74) *Attorney, Agent, or Firm* — Weaver Austin Villeneuve & Sampson LLP; Brian D. Griedel

(57) ABSTRACT

Certain aspects pertain to methods of fabricating an optical device on a substantially transparent substrate that include a pre-deposition operation that removes a width of lower conductor layer at a distance from the outer edge of the substrate to form a pad at the outer edge. The pad and any deposited layers of the optical device may be removed in a post edge deletion operation.

23 Claims, 18 Drawing Sheets

Related U.S. Application Data continuation-in-part of application No. PCT/US2015/039089, filed on Jul. 2, 2015, and a continuation-in-part of application No. 14/822,732, filed on Aug. 10, 2015, now Pat. No. 10,114,265, which is a continuation of application No. 14/362,863, filed as application No. PCT/US2012/068817 on Dec. 10, 2012, now Pat. No. 9,454,053.

(60) Provisional application No. 62/020,943, filed on Jul. 3, 2014, provisional application No. 62/096,783, filed on Dec. 24, 2014, provisional application No. 61/569,716, filed on Dec. 12, 2011, provisional application No. 61/664,638, filed on Jun. 26, 2012, provisional application No. 61/709,046, filed on Oct. 2, 2012.

(51) Int. Cl.
  *B32B 38/10* (2006.01)
  *B32B 38/00* (2006.01)
  *G02F 1/155* (2006.01)

(52) U.S. Cl.
  CPC .... *Y10T 29/49126* (2015.01); *Y10T 156/1052* (2015.01)

(56) References Cited

U.S. PATENT DOCUMENTS

| | | |
|---|---|---|
| 5,724,175 A | 3/1998 | Hichwa et al. |
| 5,830,336 A | 11/1998 | Schulz et al. |
| 5,877,936 A | 3/1999 | Nishitani et al. |
| 5,995,271 A | 11/1999 | Zieba et al. |
| 6,055,089 A | 4/2000 | Schulz et al. |
| 6,176,715 B1 | 1/2001 | Buescher |
| 6,284,412 B1 | 9/2001 | Minakata et al. |
| 6,407,847 B1 | 6/2002 | Poll et al. |
| 6,515,787 B1 | 2/2003 | Westfall et al. |
| 6,822,778 B2 | 11/2004 | Westfall et al. |
| 7,710,671 B1 | 5/2010 | Kwak et al. |
| 7,719,751 B2 | 5/2010 | Egerton et al. |
| 7,777,933 B2 | 8/2010 | Piroux et al. |
| 8,035,882 B2 | 10/2011 | Fanton et al. |
| 8,071,420 B2 | 12/2011 | Su et al. |
| 8,164,818 B2 | 4/2012 | Collins et al. |
| 9,019,588 B2 | 4/2015 | Brown et al. |
| 9,102,124 B2 | 8/2015 | Collins et al. |
| 9,454,053 B2 | 9/2016 | Strong et al. |
| 9,482,921 B2 | 11/2016 | Lamine et al. |
| 9,581,875 B2 | 2/2017 | Burdis et al. |
| 9,703,167 B2 | 7/2017 | Parker et al. |
| 9,958,750 B2 | 5/2018 | Parker et al. |
| 9,995,985 B2 | 6/2018 | Parker et al. |
| 10,114,265 B2 | 10/2018 | Strong et al. |
| 10,295,880 B2 | 5/2019 | Dixit et al. |
| 10,303,032 B2 | 5/2019 | Broussard et al. |
| 10,409,130 B2 | 9/2019 | Parker et al. |
| 10,551,711 B2 | 2/2020 | Kozlowski et al. |
| 10,795,232 B2 | 10/2020 | Strong et al. |
| 10,802,371 B2 | 10/2020 | Dixit et al. |
| 2002/0075552 A1 | 6/2002 | Poll et al. |
| 2002/0149829 A1 | 10/2002 | Mochizuka et al. |
| 2003/0137712 A1 | 7/2003 | Westfall et al. |
| 2003/0227663 A1 | 12/2003 | Agrawal et al. |
| 2004/0042059 A1 | 3/2004 | Minami et al. |
| 2004/0202001 A1 | 10/2004 | Roberts et al. |
| 2004/0234678 A1 | 11/2004 | Hirai et al. |
| 2006/0018000 A1 | 1/2006 | Greer |
| 2006/0098289 A1 | 5/2006 | McCabe et al. |
| 2007/0138949 A1 | 6/2007 | Yoshida et al. |
| 2008/0030836 A1 | 2/2008 | Tonar et al. |
| 2008/0099065 A1 | 5/2008 | Ito et al. |
| 2008/0266642 A1 | 10/2008 | Burrell et al. |
| 2009/0272483 A1 | 11/2009 | Howes |
| 2009/0304912 A1 | 12/2009 | Kwak et al. |
| 2009/0323162 A1 | 12/2009 | Fanton et al. |
| 2010/0067090 A1 | 3/2010 | Egerton et al. |
| 2010/0243427 A1 | 9/2010 | Kozlowski et al. |
| 2010/0245973 A1 | 9/2010 | Wang et al. |
| 2010/0321758 A1 | 12/2010 | Bugno et al. |
| 2011/0096388 A1 | 4/2011 | Agrawal et al. |
| 2011/0148218 A1 | 6/2011 | Rozbicki et al. |
| 2011/0151383 A1 | 6/2011 | Yamashiro et al. |
| 2011/0199666 A1 | 8/2011 | Chun et al. |
| 2011/0211247 A1 | 9/2011 | Kozlowzki et al. |
| 2011/0260961 A1 | 10/2011 | Burdis et al. |
| 2011/0266137 A1 | 11/2011 | Wang et al. |
| 2011/0266138 A1 | 11/2011 | Wang et al. |
| 2011/0267673 A1 | 11/2011 | Agrawal et al. |
| 2011/0267674 A1 | 11/2011 | Wang et al. |
| 2011/0267675 A1 | 11/2011 | Wang et al. |
| 2012/0026573 A1 | 2/2012 | Collins et al. |
| 2012/0033287 A1 | 2/2012 | Friedman et al. |
| 2012/0147449 A1 | 6/2012 | Bhatnagar et al. |
| 2012/0218620 A1 | 8/2012 | Kwak et al. |
| 2012/0327499 A1 | 12/2012 | Parker et al. |
| 2013/0222877 A1 | 8/2013 | Greer et al. |
| 2013/0278988 A1 | 10/2013 | Jack et al. |
| 2014/0253996 A1 | 9/2014 | Burdis et al. |
| 2014/0340731 A1 | 11/2014 | Strong et al. |
| 2015/0092260 A1 | 4/2015 | Parker et al. |
| 2015/0153622 A1 | 6/2015 | Kaleit et al. |
| 2015/0362816 A1 | 12/2015 | Strong et al. |
| 2016/0103379 A1 | 4/2016 | Kozlowzki et al. |
| 2016/0114523 A1 | 4/2016 | Luten et al. |
| 2016/0138328 A1 | 5/2016 | Behmke et al. |
| 2016/0199936 A1 | 7/2016 | Luten et al. |
| 2017/0115544 A1 | 4/2017 | Parker et al. |
| 2017/0176831 A1 | 6/2017 | Dixit et al. |
| 2017/0219903 A1 | 8/2017 | Strong et al. |
| 2018/0210307 A1 | 7/2018 | Parker et al. |
| 2018/0259822 A1 | 9/2018 | Dixit et al. |
| 2019/0079365 A1 | 3/2019 | Sarrach et al. |
| 2019/0346732 A1 | 11/2019 | Parker et al. |
| 2020/0384738 A1 | 12/2020 | Strong et al. |
| 2021/0001426 A1 | 1/2021 | Dixit et al. |

FOREIGN PATENT DOCUMENTS

| | | |
|---|---|---|
| CN | 1537257 A | 10/2004 |
| CN | 1620678 A | 5/2005 |
| CN | 1688923 A | 10/2005 |
| CN | 1808271 A | 7/2006 |
| CN | 1993648 A | 7/2007 |
| CN | 101276079 A | 10/2008 |
| CN | 101421666 A | 4/2009 |
| CN | 102388340 A | 3/2012 |
| CN | 104011588 A | 8/2014 |
| EP | 3 238 253 | 11/2017 |
| JP | S59-94744 A | 5/1984 |
| JP | 2001-051307 A | 2/2001 |
| JP | 2001-051308 A | 2/2001 |
| JP | 2001-133816 A | 5/2001 |
| JP | 2002-076390 A | 3/2002 |
| JP | 2008-542578 A | 11/2008 |
| JP | 2011-128504 A | 6/2011 |
| JP | 2011-526378 A | 10/2011 |
| KR | 10-2004-0031685 | 4/2004 |
| TW | 201013286 A | 4/2010 |
| TW | 201029838 A | 8/2010 |
| TW | 201215981 A | 4/2012 |
| TW | 201342509 A | 10/2013 |
| TW | 201435464 A | 9/2014 |
| WO | WO2009/148861 A2 | 12/2009 |
| WO | WO2010/093703 A1 | 8/2010 |
| WO | WO2011/028254 A2 | 3/2011 |
| WO | WO2011/050291 A2 | 4/2011 |
| WO | WO2012/078634 A2 | 6/2012 |
| WO | WO2012/138281 A1 | 10/2012 |
| WO | WO2013/090209 A1 | 6/2013 |
| WO | WO2013/163107 A1 | 10/2013 |
| WO | WO2014/201287 | 12/2014 |

(56) References Cited

FOREIGN PATENT DOCUMENTS

| WO | WO 2015/103433 A1 | 7/2015 |
|---|---|---|
| WO | WO2016/004373 A1 | 1/2016 |
| WO | WO2016/105549 A2 | 6/2016 |

OTHER PUBLICATIONS

US Office Action dated May 15, 2019 for U.S. Appl. No. 14/884,683.
US Office Action dated May 10, 2016 for U.S. Appl. No. 14/512,297.
US Notice of Allowance dated Oct. 4, 2016 for U.S. Appl. No. 14/512,297.
US Notice of Allowance dated May 12, 2017 for U.S. Appl. No. 14/512,297.
US Office Action dated Oct. 15, 2015 for U.S. Appl. No. 14/512,297.
US Final Office Action dated Oct. 16, 2017 in U.S. Appl. No. 15/364,162.
US Notice of Allowance dated Feb. 6, 2018 in U.S. Appl. No. 15/364,162.
US Office Action dated Mar. 28, 2017 for U.S. Appl. No. 15/364,162.
US Office Action dated Aug. 1, 2018 for U.S. Appl. No. 15/934,854.
US Notice of Allowance dated Jan. 4, 2019 for U.S. Appl. No. 15/934,854.
US Notice of Allowance dated Apr. 26, 2019 for U.S. Appl. No. 15/934,854.
US Notice of Allowance dated May 6, 2016 in U.S. Appl. No. 14/362,863.
US Notice of Allowance (corrected) dated May 19, 2016 in U.S. Appl. No. 14/362,863.
US Office Action dated Jan. 29, 2016 in U.S. Appl. No. 14/362,863.
US Notice of Allowance dated Jun. 26, 2018 in U.S. Appl. No. 14/822,732.
US Office Action dated Sep. 12, 2017 in U.S. Appl. No. 14/822,732.
US Office Action dated Jun. 29, 2018 in U.S. Appl. No. 15/491,869.
US Office Action dated Feb. 15, 2019 in U.S. Appl. No. 15/491,869.
US Notice of Allowance dated May 23, 2018 in U.S. Appl. No. 15/390,421.
US Notice of Allowance dated Sep. 19, 2018 in U.S. Appl. No. 15/390,421.
US Notice of Allowance dated Jan. 2, 2019 in U.S. Appl. No. 15/390,421.
TW Office Action dated Jun. 20, 2018 in TW Application No. 106119450.
European Search Report dated Mar. 29, 2019 for EP Application No. 19150851.4.
International Search Report and Written Opinion dated Mar. 29, 2013, in PCT/US2012/068817.
International Preliminary Report on Patentability dated Jun. 26, 2014 in PCT/US2012/068817.
International Search Report and Written Opinion dated Jun. 29, 2016, in PCT/US2015/00411.
International Preliminary Report on Patentability dated Jun. 27, 2017, in PCT/US2015/00411.
International Search Report and Written Opinion dated Oct. 30, 2015, in PCT/U52015/039089.
International Preliminary Report on Patentability dated Jan. 12, 2017, in PCT/US2015/039089.
European Search Report dated Jul. 10, 2015 for EP Application No. 12857376.3.
European Office Action dated Jul. 28, 2016 for EP Application No. 12857376.3.
European Search Report dated Apr. 24, 2018 for EP Application No. 17197774.7.
European Search Report dated Jan. 17, 2019 for EP Application No. 15873818.7.
Singapore Search Report and Written Opinion dated Apr. 19, 2017 for SG Application No. 10201608917Q.
Singapore Exam Report and Grant Notice dated Mar. 5, 2018 for SG Application No. 10201608917Q.
TW Office Action dated Oct. 20, 2016 in TW Application No. 101146775.
TW Office Action dated Feb. 15, 2017 in TW Application No. 101146775.
TW Office Action dated Aug. 31, 2018 in TW Application No. 106146406.
CN Office Action dated Mar. 21, 2016 in CN Application No. 201280061260.9.
CN Office Action dated Feb. 4, 2017 in CN Application No. 201280061260.9.
CN Office Action dated Oct. 16, 2017 in CN Application No. 201280061260.9.
CN Office Action (Decision of Rejection) dated May 15, 2018 in CN Application No. 201280061260.9.
CN Office Action dated Feb. 2, 2019 in CN Application No. 201280061260.9.
KR Office Action dated Dec. 20, 2018 in KR Application No. 2014-7018018.
RU Office Action dated Apr. 14, 2017 in RU Application No. 2014128536.
RU Notice of Allowance dated Jul. 19, 2017 in RU Application No. 2014128536.
Taiwanese Office Action dated Jan. 31, 2019 for TW Application No. 104121575.
European Search Report dated Jan. 30, 2018 for EP Application No. 15814398.2.
U.S. Preliminary Amendment dated Sep. 17, 2019 for U.S. Appl. No. 16/523,852.
U.S. Notice of Allowance dated Sep. 23, 2019 for U.S. Appl. No. 14/884,683.
U.S. Office Action dated Oct. 25, 2019 for U.S. Appl. No. 16/523,852.
U.S. Office Action dated Apr. 2, 2020 for U.S. Appl. No. 16/523,852.
U.S. Office Action dated Sep. 16, 2020 for U.S. Appl. No. 16/523,852.
U.S. Final Office Action dated Aug. 22, 2019 in U.S. Appl. No. 15/491,869.
U.S. Office Action dated Jan. 10, 2020 in U.S. Appl. No. 15/491,869.
U.S. Notice of Allowance dated May 14, 2020 in U.S. Appl. No. 15/491,869.
U.S. Notice of Allowance dated Jan. 23, 2020 in U.S. Appl. No. 15/539,650.
U.S. Corrected Notice of Allowability dated Apr. 24, 2020 in U.S. Appl. No. 15/539,650.
U.S. Notice of Allowance dated May 15, 2020 in U.S. Appl. No. 15/539,650.
European Office Action dated Jun. 29, 2020 for EP Application No. 19150851.4.
European Search Report dated Mar. 28, 2019 for EP Application No. 17197774.7.
CA Office Action dated Jan. 13, 2020 in CA Application No. 2,859,023.
CN Office Action dated May 6, 2020 in CN Application No. 201280061260.9, with English Translation.
CN Office Action dated Oct. 14, 2019 in CN Application No. 201480073448.4.
AU Examination report No. 1 for Standard patent application, dated Jul. 13, 2020, for Australian Patent Application No. 2015371272.
AU Notice of Acceptance for patent application, dated Oct. 6, 2020, for Australian Patent Application No. 2015371272.
CN Office Action dated Mar. 16, 2020 in CN Application No. 201580074719.2 with translation.
KR Office Action dated Oct. 30, 2019 in KR Application No. 2014-7018018.
KR Notice of Decision to Grant, dated Jan. 30, 2020, in KR Application No. 2014-7018018.
KR Office Action, Notification of Provisional Rejection, dated Jun. 22, 2020 in KR Application No. 10-2020-7008593.
CN Office Action dated Feb. 3, 2020 in CN Application No. 201580039994.0 with translation.
European Office Action, dated Feb. 18, 2020, for EP Application No. 15814398.2.
U.S. Appl. No. 16/947,834, filed Aug. 19, 2020, Strong et al.
U.S. Appl. No. 16/947,841, filed Aug. 19, 2020, Dixit et al.
U.S. Preliminary Amendment filed Aug. 31, 2020 in U.S. Appl. No. 16/947,841.

(56) References Cited

OTHER PUBLICATIONS

U.S. Preliminary Amendment filed Aug. 26, 2020 in U.S. Appl. No. 16/947,834.
Summons to attend oral proceedings dated May 12, 2020 for EP Application No. 17197774.7.
Response to Summons dated Oct. 23, 2020 for EP Application No. 17197774.7.
Results of the telephone consultation dated Dec. 1, 2020 for EP Application No. 17197774.7.
Minutes of the Oral Proceedings dated Dec. 3, 2020 for EP Application No. 17197774.7.
Notice of Allowance dated Dec. 16, 2020 for EP Application No. 17197774.7.
CA Office Action dated Dec. 4, 2020 in CA Application No. 2,859,023.
CN Rejection Decision dated Dec. 1, 2020 in CN Application No. 201280061260.9, with English Translation.
CN Office Action dated Dec. 24, 2020 in CN Application No. 201580039994.0, with English Translation.
Taiwanese Office Action dated Nov. 13, 2020 for TW Application No. 109106926 with English Translation.
U.S. Notice of Allowance dated Mar. 12, 2021 for U.S. Appl. No. 16/523,852.
CN Office Action dated Feb. 3, 2021 in CN Application No. 201580074719.2 with English translation.
CN Notice of Allowance with Search Report dated May 27, 2021 in CN Application No. 201580039994.0, with English Translation.
Taiwanese Notice of Allowance dated May 28, 2020 for TW Application No. 109106926 with English Translation, No Translation.
Decision to Grant dated Apr. 22, 2021 for EP Application No. 17197774.7.
Notice of Allowance dated May 17, 2021 for EP Application No. 15873818.7.
TW Office Action dated May 10, 2021 in TW Application No. 108117698, with English Translation.
CN Reexamination Decision dated Mar. 25, 2021 in CN Application No. 201280061260.9, No Translation.
KR Office Action, Notification of Provisional Rejection, dated Apr. 8, 2020 in KR Application No. 10-2020-7008593, No Translation.

NARROW PRE-DEPOSITION LASER DELETION

CROSS-REFERENCES TO RELATED APPLICATIONS

This application is a continuation of U.S. patent application Ser. No. 15/390,421, titled "NARROW PRE-DEPOSITION LASER DELETION," and filed on Dec. 23, 2016, which is a continuation-in-part of International PCT Application PCT/US15/39089 (designating the United States), titled "NARROW PRE-DEPOSITION LASER DELETION" and filed on Jul. 2, 2015, which claims benefit of and priority to U.S. Provisional Patent Application No. 62/020,943, titled "NARROW PRE-DEPOSITION LASER EDGE DELETION" and filed on Jul. 3, 2014 and to U.S. Provisional Application No. 62/096,783, titled "THIN-FILM DEVICES AND FABRICATION" and filed on Dec. 24, 2014; U.S. patent application Ser. No. 15/390,421 is also a continuation-in-part of U.S. patent application Ser. No. 14/822,732 (U.S. Pat. No. 10,114,265), titled "THIN-FILM DEVICES AND FABRICATION" and filed on Aug. 10, 2015, which is a continuation of U.S. patent application Ser. No. 14/362,863 (U.S. Pat. No. 9,454,053), titled "THIN-FILM DEVICES AND FABRICATION" and filed on Jun. 4, 2014; U.S. patent application Ser. No. 14/362,863 is a national stage application under 35 U.S.C. § 371 to International PCT Application PCT/US2012/068817 (designating the United States), filed on Dec. 10, 2012 and titled "THIN-FILM DEVICES AND FABRICATION," which claims benefit of and priority to U.S. Provisional Patent Application 61/569,716, filed on Dec. 12, 2011, U.S. Provisional Patent Application 61/664,638 filed on Jun. 26, 2012, and U.S. Provisional Patent Application 61/709,046 field on Oct. 2, 2012; all of these applications are hereby incorporated by reference in their entireties and for all purposes.

FIELD

Embodiments described herein generally relate to optical devices such as electrochromic devices, and methods of fabricating optical devices.

BACKGROUND

Various optically switchable devices are available for controlling tinting, reflectivity, etc. of window panes. Electrochromic devices are one example of optically switchable devices generally. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause it to darken; reversing the voltage causes it to lighten. This capability allows for control of the amount of light that passes through the window, and presents an enormous opportunity for electrochromic windows to be used not only for aesthetic purposes but also for energy-savings. With energy conservation being of foremost concern in modern energy policy, it is expected that growth of the electrochromic window industry will be robust in the coming years.

An important aspect of electrochromic window fabrication is coating of material layers (e.g., thin films) on a substantially transparent substrate (e.g. glass) to form an electrochromic device stack. Part of fabrication includes removing portions of the EC device stack to make it functional and/or masking to pattern the device. For example, laser patterning of various layers are employed to make EC devices functional, e.g. to configure electrical connectivity and other aspects of the device's configuration on a substrate.

SUMMARY OF INVENTION

Described herein are optical devices such as electrochromic devices, and methods of fabricating optical devices.

Certain embodiments are directed to methods of fabricating an optical device on a substantially transparent substrate. In one case, the method comprises receiving the substantially transparent substrate with a lower conductor layer covering a substantial area of the substantially transparent substrate. The method further comprises removing a first width of the lower conductor layer at a distance from an outer edge along one or more sides of the substantially transparent substrate and to sufficient depth to remove the lower conductor layer along the one or more sides. The method further comprises after removing the first width, depositing one or more material layers of the optical device.

In certain embodiments, improved methods of fabricating optical devices comprise selective removal of portions of a lower conductor layer. In some embodiments, this selective removal leaves a portion of the lower conductor layer about the perimeter of the substrate while one or more optical device layers are deposited thereon. After fabrication of the optical device, the device stack, along with the perimeter portion of the lower conductor layer, are removed so that a strong and durable seal can be made, e.g. with an insulated glass unit (IGU) spacer.

Certain embodiments are directed to methods of fabricating an optical device comprising one or more material layers sandwiched between a first and a second conductor layer. One method comprises receiving a substrate with the first conductor layer over its work surface. The method further comprises removing a first width of the first conductor layer in a region along between about 50% and about 90% of the perimeter of the substrate while leaving a pad of the first conductor layer coextensive with the first width along the perimeter. The method further comprises depositing said one or more material layers of the optical device and the second conductor layer over the work surface of the substrate and removing a second width of all the layers along substantially the entire perimeter of the substrate, wherein the depth of removal is at least sufficient to remove the first conductor layer, and wherein the second width of removal is sufficient to remove the pad and the remaining 10% to 50% of the first conductor layer along the perimeter of the substrate. In this method, at least one of the first and second conducting layers is transparent. In some cases, this method further comprises removing a region of the one or more layers of the optical device and the second conductor layer revealing an exposed portion of the first conducting layer and applying a bus bar to said an exposed portion of the first conducting layer.

These and other features and advantages will be described in further detail below, with reference to the associated drawings.

BRIEF DESCRIPTION OF THE DRAWINGS

The following detailed description can be more fully understood when considered in conjunction with the drawings in which.

DETAILED DESCRIPTION

Figure 1A:
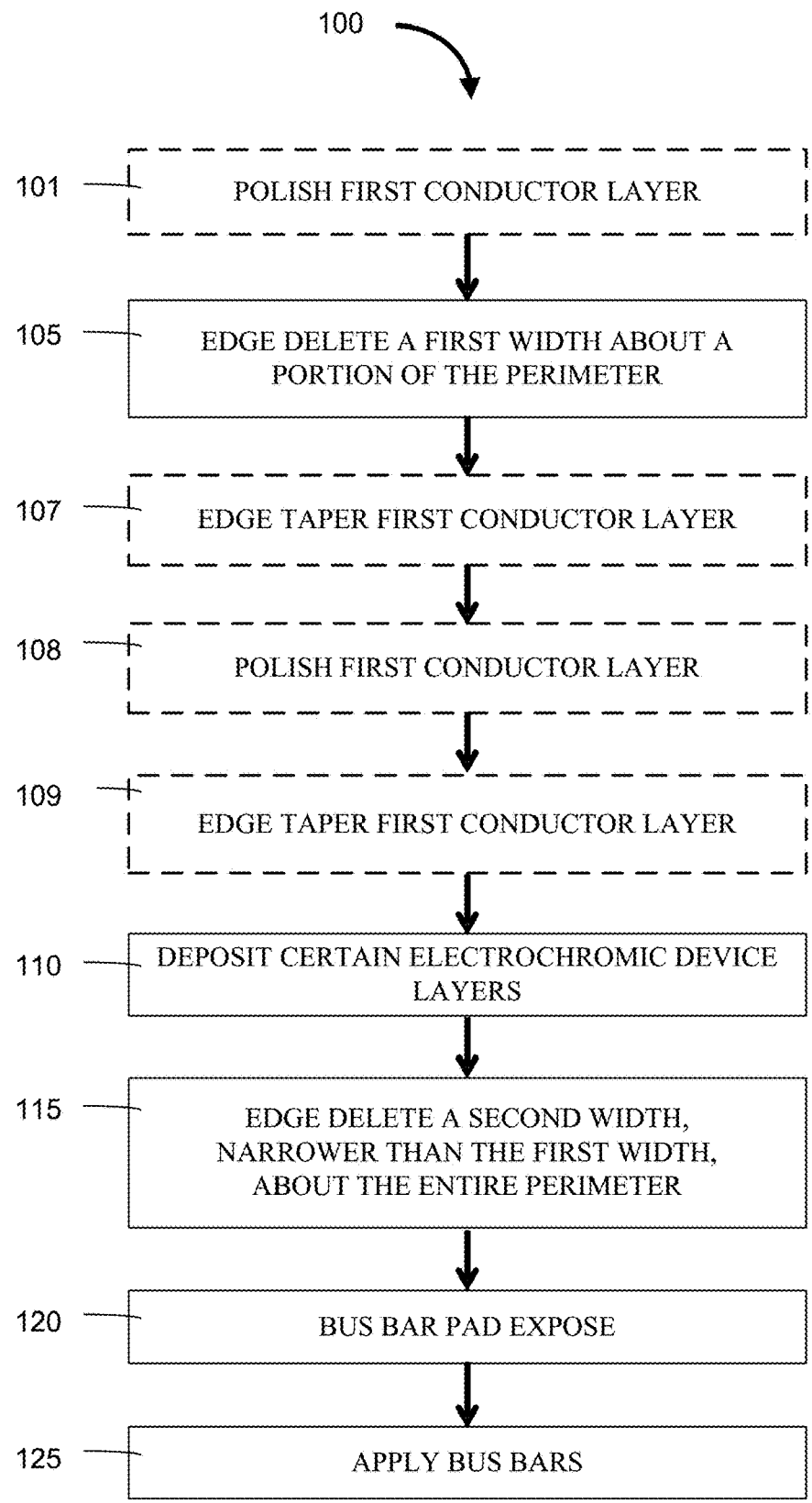
FIG. 1A is a flowchart of a process flow describing aspects of a method of fabricating an electrochromic device, according to certain embodiments.

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While certain embodiments are described in conjunction with electrochromic devices, it will be understood that other optical devices may be used.

Introduction to Laser Deletion Processes

Before, during, or after formation of layers of an optical device (e.g., electrochromic device) on a substantially transparent substrate (e.g., glass substrate), deletion operations such as edge deletion and laser scribing can be used to remove material from the optical device in certain embodiments. "Deletion" generally refers to one or more operations that remove one or more material layer(s) of the optical device from one or more regions. For example, deletion may remove the upper conductor layer and the electrochromic stack of an electrochromic device, or may remove the upper conductor layer, electrochromic stack, and the lower conductor layer of an electrochromic device. In some embodiments, deletion is used to remove material layers along one or more sides of an optical device. "Edge deletion" can refer to deletion of one or more material layers along the one or more sides to the outer edge of the substrate having the optical device disposed thereon. Edge deletion may remove material down to the glass, down to a lower transparent conductor layer or down to one or more sodium diffusion barrier layers (if present).

Deletion performed using laser energy or other source of electromagnetic radiation is generally referred to herein as laser deletion, although certain embodiments may use non-laser or other electromagnetic radiation sources. For example, edge deletion may be performed by mechanical means, such as grinding, sand blasting or chemical etching. Edge deletion performed using laser energy or other source of electromagnetic radiation is referred to herein as laser edge deletion (LED), although certain embodiments may use non-laser sources. Electromagnetic energy, such as laser energy, is oftentimes preferable due to several advantages such as non-contact with the work piece, variable power and laser types available, etc.

In the case of deletion techniques that utilize a laser, the laser tool may include a scanner that uses a laser pattern to direct the laser spot to various locations over the electrochromic device stack to remove the material. An example of a commercially available scanner that can be used in certain embodiments is provided by SCANLAB AG of Munich, Germany.

An electrochromic (EC) device comprises an electrochromic stack and upper and lower conductor layers sandwiching the electrochromic stack. The lower (first) conductor layer is the layer generally proximate to the substrate and the upper (second) conductor layer is the layer distal to the substrate. These materials are disposed on a substantially transparent substrate (e.g., glass substrate) to form an EC lite (pane). In some cases, there may be other layers between the electrochromic device and the substantially transparent substrate such as, for example, a buffer layer. As another example, there may be one or more diffusion barrier layers between the lower conductor layer and the substrate (e.g. if soda lime glass is used as the substrate and sodium contamination of the device is to be avoided). The electrochromic stack typical comprises an EC layer (e.g., $WO_3$ layer), an ion conductor (IC) layer (e.g. an appropriate lithium ion conducting material such as lithium tungstate), and a counter electrode (CE) layer (e.g., an amorphous NiWO layer). The IC layer may be a separately deposited layer or may be an interfacial region created between the contacting and separately deposited EC and CE layers. One or both of the upper conductor layer and lower conductor layer may be a transparent conductive oxide (TCO) layer such as, for example, an indium tin oxide layer.

"Laser scribing" can refer to a process that removes one or more layers of the optical device along a line or curve. Laser scribing can be used to isolate portions of the optical device, for example, portions that may be damaged during an edge deletion process. In certain illustrated examples having electrochromic devices, an optional isolation scribe is illustrated as an "L3" scribe. Generally, the L3 scribe passes through the upper conductor layer and optionally through one or more layers of electrochromic stack, but not through the lower conductor layer.

Although "L3," "LED," and other deletion areas may be shown in illustrated examples, these features are optional and one or more may be omitted. Some examples of deletion techniques can be found in U.S. patent application Ser. No. 12/645,111, titled "FABRICATION OF LOW DEFECTIVITY ELECTROCHROMIC DEVICES," filed on Dec. 22, 2009; U.S. patent application Ser. No. 13/456,056, titled "ELECTROCHROMIC WINDOW FABRICATION METHODS," filed on Apr. 25, 2012; PCT International Patent Application No. PCT/US2012/068817, titled "THIN-FILM DEVICES AND FABRICATION," filed on Dec. 10, 2012; and PCT International Application PCT/US14/42819, titled "ELECTROCHROMIC DEVICES ON NON-RECTANGULAR SHAPES," filed on Jun. 17, 2014, which are hereby incorporated by reference in their entirety.

Pre-Deposition Deletion Processes

Certain embodiments described herein relate to methods of fabricating optical devices that include deletion operations that are performed before depositing certain layers of the optical device. These pre-deposition operations are typically referred to as pre-deposition laser deletion (PDLD) operations, although non-laser sources may be used to remove the material in certain cases. In embodiments with electrochromic devices, the PDLD operations may be performed before depositing the electrochromic stack and/or the upper conductor layer. In certain aspects, the PDLD operations remove material in region(s) (e.g., areas) along one or more sides of the optical device. For example, PDLD operations may be used to remove the first conductor layer (e.g., transparent electrical conductor (TEC)) over the substantially transparent substrate (e.g., glass substrate) in the region(s).

It is to be understood that PDLD operations could be implemented using one or more masks. For example, a mask or masks, that mimic the region(s) where a TCO on a substrate would otherwise be removed, may be used to cover that region(s) prior to TCO deposition on the substrate. Generally, certain embodiments described herein are done so in relation to receiving a substrate with a pre-applied TCO and performing PDLD to remove a select region(s) of the TCO. However, masks may be used on a substrate and then TCO deposited to provide the same result of PDLD. There are certain advantages realized by removing materials after deposition rather than with using masks, however. For example, the desired patterns for deletion can be chosen after deposition rather than before—this allows for greater flexibility, e.g. when design changes are warranted in real time.

An example of a fabrication method that uses PDLD operations is described in detail with reference to FIGS. 1A-1E. Another example of a fabrication method that uses PDLD operations is described below with reference to FIGS. 2-4. Yet another example of a fabrication method that uses PDLD operations is described below with reference to FIGS. 5-7.

Figure 1B:
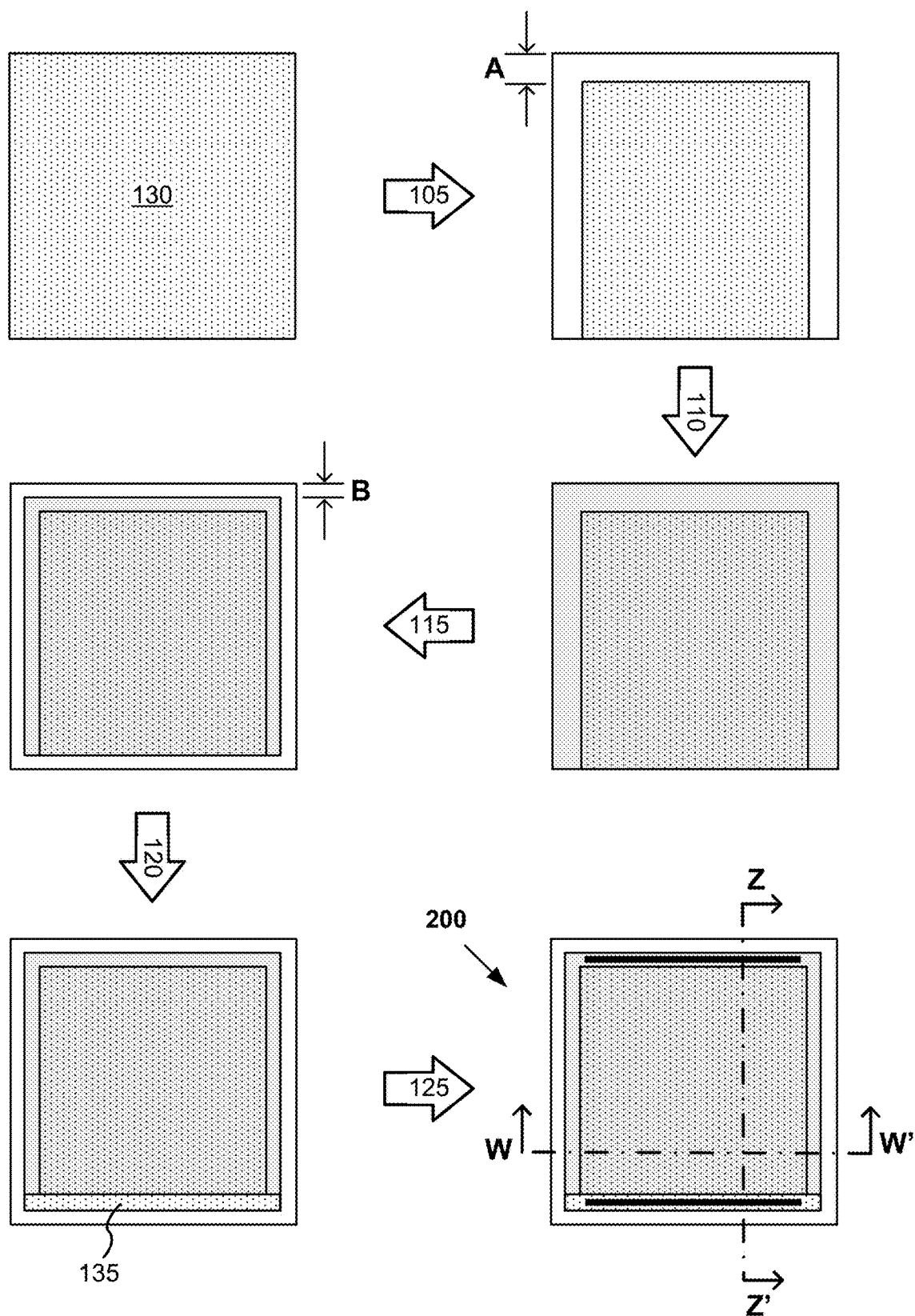
FIG. 1B depicts top views illustrating steps in the process flow described in relation to FIG. 1A.
Figure 1C:
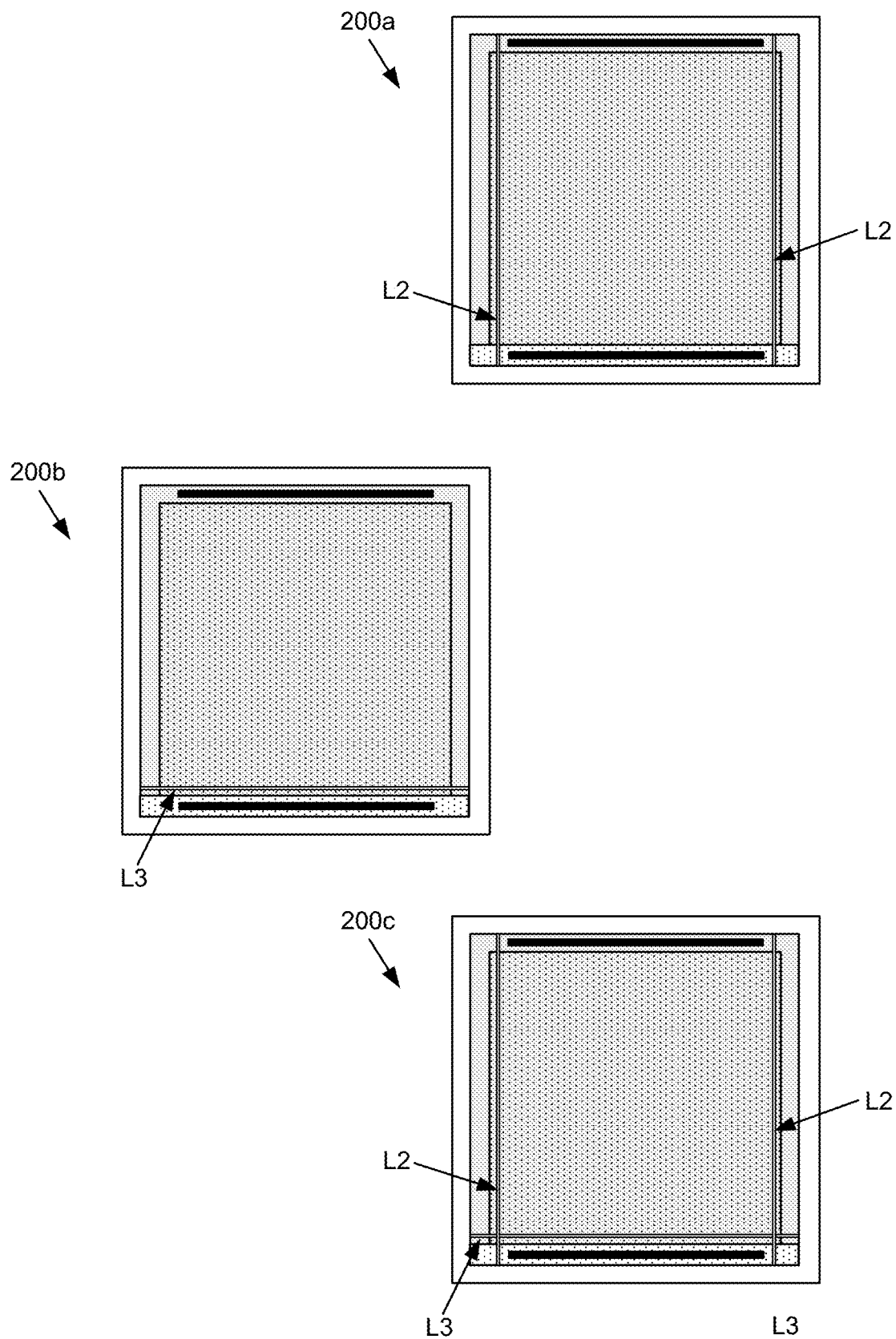
FIG. 1C depicts top views of devices similar to that described in relation to FIG. 1B.
Figure 1D:
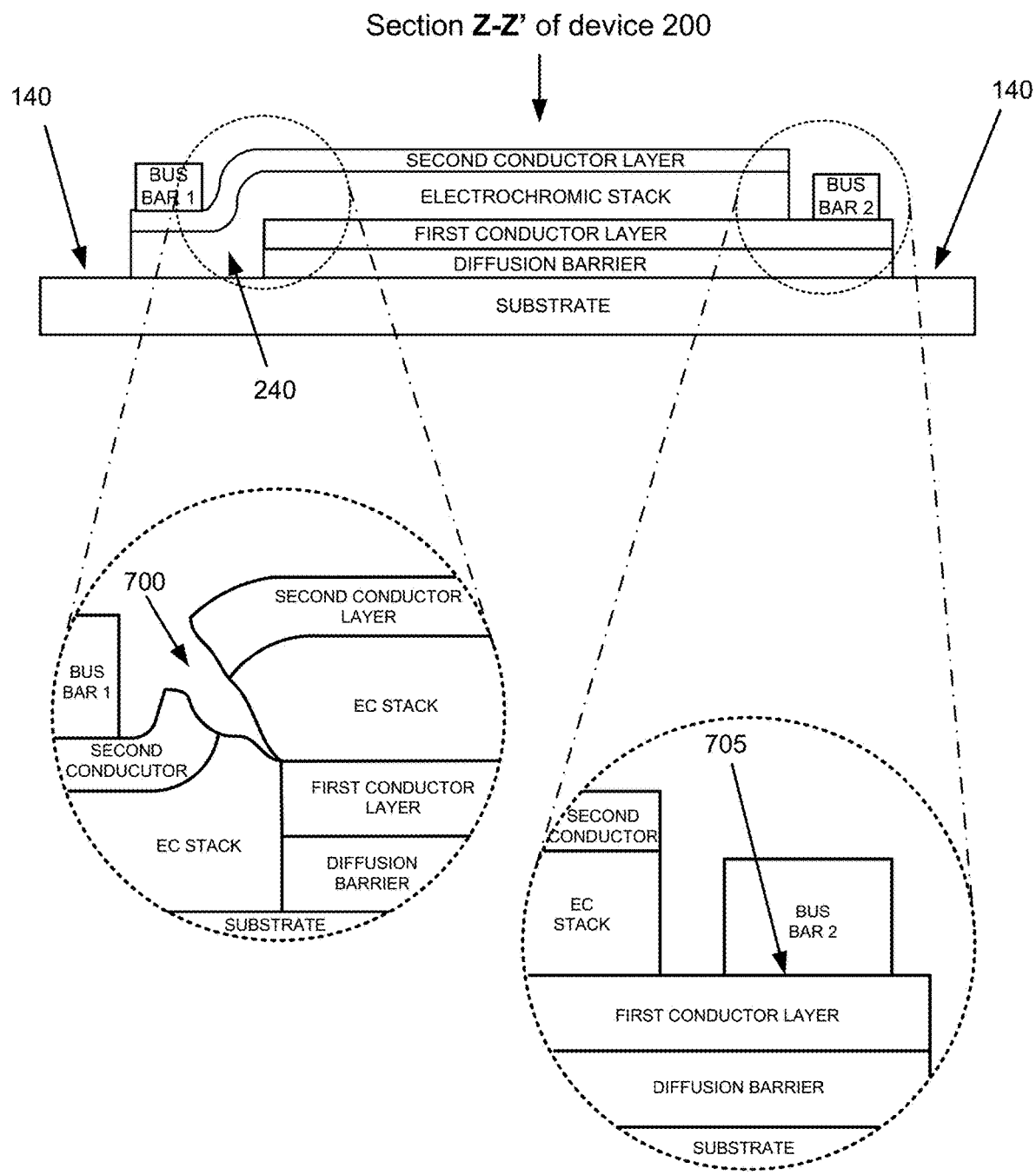
FIG. 1D depicts the Z-Z' cross-sectional view of the electrochromic lite described in relation to FIG. 1B.
Figure 1E:
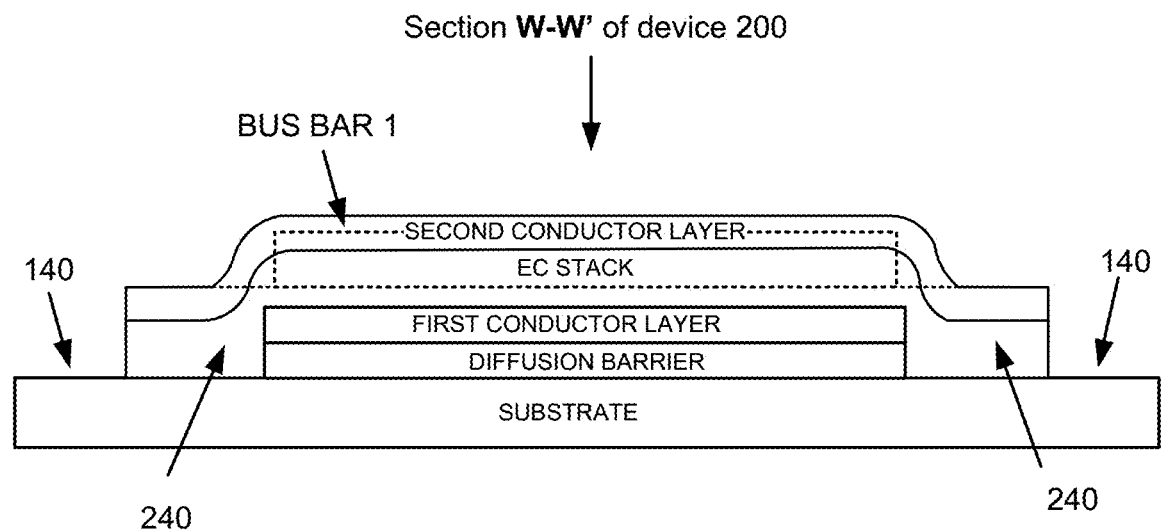
FIG. 1E depicts the W-W' cross-sectional view of the electrochromic lite described in relation to FIG. 1B.

FIG. 1A is a process flow, 100, describing aspects of a method of fabricating an optical device (e.g., electrochromic device) having a pair of bus bars, each applied to one of the conductor layers of the optical device. The dotted lines denote optional steps. An exemplary EC device, 200, as described in relation to FIGS. 1B-C, is used to illustrate the process flow. The device 200 is disposed over a substantially transparent substrate (e.g., glass). FIG. 1B provides top views depicting the fabrication of the device 200 including numerical indicators of the process flow 100 as described in relation to FIG. 1A. FIGS. 1D and 1E are cross-sections of an optical device lite including the device 200 described in relation to FIG. 1B. The device 200 is a rectangular device, but process flow 100 can apply to any shape of device. Some examples of non-rectangular optical devices can be found in PCT International Application PCT/US14/42819, titled "ELECTROCHROMIC DEVICES ON NON-RECTANGULAR SHAPES," filed on Jun. 17, 2014, which is incorporated by reference herein.

Referring to FIGS. 1A and 1B, after receiving a substrate with a lower (first) conductor layer thereon, the process flow 100 begins with an optional polishing of the lower conductor layer (e.g., lower transparent conductor oxide), see 101. In certain embodiments, polishing the lower conductor layer has been found to enhance the optical properties of, and performance of, EC devices fabricated thereon. Polishing of transparent conducting layers prior to electrochromic device fabrication thereon is described in patent application, PCT/US12/57606, titled, "Optical Device Fabrication," filed on Sep. 27, 2012, which is hereby incorporated by reference in its entirety. Polishing, if performed, may be done prior to an edge deletion, see 105, or after an edge deletion in the process flow. In certain embodiments, the lower conductor layer may be polished both before and after edge deletion. Typically, the lower conductor layer is polished only once. The PDLD operation performed may be similar to the one described in detail with respect to step 105 in FIG. 1A Referring again to FIG. 1A, if polishing 101 is not performed, process 100 begins with a pre-deposition edge deletion process that removes (deletes) a first width of the lower conductor layer about a region of the perimeter of the substrate, see 105. In FIG. 1B, this portion removed has a width "A" and is to the outer edge of the substrate. In certain embodiments such as the one shown in FIG. 1B, the deleted portion (region) is along all but one side of the perimeter of the substrate. In another embodiment, the deleted region is along a single side of the substrate (e.g., the upper conductor layer (e.g., ITO) bus bar side). The edge deletion may remove only the lower conductor layer or may also remove a diffusion barrier, if present. In one embodiment, the substrate is glass and includes a sodium diffusion barrier and a lower transparent conducting layer thereon, e.g., a tin-oxide based transparent metal oxide conducting layer. The dotted fill area in FIG. 1B denotes the lower conductor layer. Thus, after edge deletion according to process 105, transparent conductor of a width A is removed from three sides of the perimeter of substrate 130. This width is typically, but not necessarily, a uniform width. A second width, B, is described below. Where width A and/or width B are not uniform, their relative magnitudes with respect to each other are in terms of their average width.

As a result of the removal of the first width A at 105, there is a newly exposed (vertical) edge of the lower conductor layer. In certain embodiments, at least a portion of this edge of the first conductor layer may be optionally tapered, see 107 and 109. Tapering may be performed so as to relieve stresses in overlying conformal material layers due to the abrupt transition over a sharp vertical edge of the underlying conductor that would otherwise exist if the edge were not tapered. The underlying diffusion barrier layer may also be tapered as part of this operation. Tapering the edge of one or more device layers, prior to fabricating subsequent layers thereon, can improve performance. "Tapering" in this context, while contemplating a sloping or beveling of the edge may also include removing material in the form of one or more steps, i.e. not a true angled or curved taper, but rather one or more stepped regions to gradually thin a region along the edge of the lower conductor layer. Tapering in the traditional sense, i.e. sloping and/or beveling can be performed, e.g., with appropriate laser beam shape, power density, exposure and the like.

In certain embodiments, the lower conductor layer is optionally polished after edge tapering, see 108. It has been found, that with certain device materials, it may be advantageous to polish the lower conductor layer after the edge taper operation, as polishing can have unexpected beneficial effects on the edge taper as well as the bulk conductor surface which may improve device performance (as described above). In certain embodiments, the edge taper is performed after polish 108, see 109. Although edge tapering is shown at both 107 and 109 operations in FIG. 1A, if performed, edge tapering would typically be performed once (e.g., at 107 or 109).

After removal of the first width A, and optional polishing and/or optional edge tapering as described above, one or more material layers of the optical device (e.g., EC device) are deposited over the surface of substrate 130, see 110. For example, this deposition can include one or more material layers of an EC stack and the second conducting layer, e.g., a transparent conducting layer such as indium tin oxide (ITO). The depicted coverage is the entire substrate, but there could be some masking due to a carrier that must hold the substrate in place at the outer edges. In one embodiment, the entire area of the remaining portion of the lower conductor layer is covered and overlapping onto the first (lower) conductor layer about the first width A where the lower conductor layer was previously removed. This allows for overlapping regions in the final device architecture.

In certain embodiments, electromagnetic radiation is used to perform edge deletion operations. For example, such edge deletion can be used to provide a peripheral region of the substrate to create a good surface for sealing by at least a portion of the primary seal and the secondary seal of the spacer of an insulated glass unit. In this case, edge deletion removes the lower transparent conductor layer and/or more layers (up to and including the top conductor layer and any vapor barrier applied thereto), depending upon when the edge deletion step is performed. In certain embodiments, edge deletion is used to at least remove material including the lower transparent conductor layer on the substrate, and optionally to remove a diffusion barrier, if present. Exemplary electromagnetic radiation includes UV, lasers, and the like. For example, material may be removed with directed and focused energy at or near one of the wavelengths 248 nm, 355 nm (i.e. UV), 1030 nm (i.e. IR, e.g., disk laser), 1064 nm (e.g., Nd:Y AG laser), and 532 nm (e.g., green laser), though these examples are non-limiting. In another embodiment, the laser emits over a wider range of wavelengths. For example, the laser may be a full spectrum laser. In other cases, the laser may emit over a narrow band of wavelengths. Laser irradiation is delivered to the substrate using, e.g., optical fiber or open beam path. The ablation can be performed from either the substrate side or the EC film side depending on the choice of the substrate handling equipment and configuration parameters. The energy density required to ablate to a particular depth is achieved by passing the laser beam through an optical lens. The optical lens focuses the laser beam to the desired shape and size. In one embodiment, a "top hat" beam configuration is used, e.g., having a focus area of between about 0.005 mm$^2$ to about 2 mm$^2$. In one embodiment, the focusing level of the beam is used to achieve the required energy density to ablate the EC film stack. In one embodiment, the energy density used in the ablation is between about 2 J/cm$^2$ and about 6 J/cm$^2$.

During certain laser delete processes, a laser spot is directed to various locations (scanned) over the surface using one or more scanning patterns. In one embodiment, the laser spot is scanned using a scanning F theta lens. Homogeneous removal of the EC device layer(s) may be achieved, e.g., by overlapping the spots' area during scanning. In one embodiment, the spot overlap of adjacent/overlapping spot locations is between about 5% and about 100%, in another embodiment between about 10% and about 90%, in yet another embodiment between about 10% and about 80%. Appropriate apparatus for undertaking LED/BPE and scribing processes is described in U.S. patent application Ser. No. 13/436,387, filed Mar. 30, 2012, titled "COAXIAL DISTANCE MEASUREMENT VIA FOLDING OF TRIANGULATION SENSOR OPTICS PATH," which is herein incorporated by reference in its entirety.

Various scanning patterns may be used to scan a laser spot, for example, in straight lines, in curved lines, etc. Using these scanning patterns, various shaped pattern areas may be scanned, such as, e.g., rectangular, round, oval, polygonal, irregular, etc. or other shaped sections that can, collectively, create the deletion area. In one embodiment, the scanned lines (or "pens," i.e., lines or curves created by adjacent or overlapping laser spots, e.g., square spot, round spot, etc.) are overlapped at the levels described above for spot overlap. That is, the area of the ablated material defined by the path of the line previously scanned is overlapped with later scanned lines of a subsequent applied scanning pattern so that there is an overlap between adjacent scanned lines. That is, a pattern area ablated by laser spots of a scanning pattern is overlapped with the pattern area of a subsequent ablation scanning pattern. For embodiments where overlapping is used for, spots, lines or scanning patterns, a higher frequency laser, e.g., in the range of between about 5 KHz and about 500 KHz, may be used. In certain embodiments, the frequency is between about 8-15 kHz, for example, between about 10-12 kHz. In some other cases, the frequency may be in the low MHz range. In order to minimize heat related damage to the EC device at the exposed edge (i.e. a heat affected zone or "HAZ"), shorter pulse duration lasers are used. In one example, the pulse duration is between about 100 fs (femtosecond) and about 100 ns (nanosecond). In another embodiment, the pulse duration is between about 1 ps (picosecond) and about 50 ns. In yet another embodiment, the pulse duration is between about 20 ps and about 30 ns. Pulse duration of other ranges can be used in other embodiments.

Referring again to FIGS. 1A and 1B, process flow 100 continues with removing a second width, B, narrower than the first width A, about substantially the perimeter of the substrate, see 115. This may include removing material down to the substrate or to a diffusion barrier, if present. After process flow 100 is complete up to 115, e.g., on a rectangular substrate as depicted in FIG. 1B, there is a perimeter area, with width B, where there is none of the first (lower) transparent conductor layer, the one or more material layers of the EC device stack, or the second (upper) conductor layer so that removing width B has exposed diffusion barrier or substrate. In certain cases, however, there may be a small amount of the first conductor layer left after this operation. Where the amount of the first conductor layer remaining is thin enough, it does not present coloration issues.

To the inside of this perimeter area defined by width B is an area with the EC device, including the first transparent conductor layer. This inside area is surrounded on three sides by the perimeter area with overlapping one or more material layers of the EC stack and the second conductor layer. On the remaining side (e.g., the bottom side in FIG. 1B), there is no overlapping portion of the one or more material layers of the EC stack and the second conductor layer. Instead, it is proximate this remaining side (e.g., bottom side in FIG. 1B) that the one or more material layers of the EC stack and the second conductor layer are removed in order to expose a portion (bus bar pad expose, or "BPE"), 135, of the first conductor layer, see 120. The BPE 135 need not run the entire length of that side, it need only be long enough to accommodate the bus bar and leave some space between the bus bar and the second conductor layer so as not to short on the second conductor layer. In one embodiment, the BPE 135 spans the length of the first conductor layer on that side.

In some embodiments, a scribe line parallel to the BPE is created through the second conductor layer but not through the first conductor layer. This scribe is sometimes referred to as an L3 isolation scribe. In some embodiments, this scribe is performed in lieu of operation 115, the removing second width B around the entire perimeter of the substrate. In another embodiment, post-deposition LED is performed on a substrate without any prescribing or removal of the transparent conductor layer(s) on non-bus bar edges. As described above, in various embodiments, a BPE is where a portion of the material layers are removed down to the first conductor layer or other conductor layer (e.g. a transparent conducting oxide layer), in order to create a surface for a bus bar to be applied and thus make electrical contact with the first conductor layer. The bus bar applied can be a soldered bus bar, and ink bus bar and the like. A BPE typically has a rectangular area, but this is not necessary; the BPE may be any geometrical shape or an irregular shape. For example, depending upon the need, a BPE may be circular, triangular, oval, trapezoidal, and other polygonal shapes. The shape may be dependent on the configuration of the EC device, the substrate bearing the EC device (e.g. an irregular shaped window), or even, e.g., a more efficient (e.g. in material removal, time, etc.) laser ablation pattern used to create it. In one embodiment, the BPE spans at least about 50% of the length of one side of an EC device. In one embodiment, the BPE spans at least about 80% of the length of one side of an EC device. In certain embodiments, angled bus bars are used, i.e. bus bars that span at least some distance of two or more sides of an EC device. In such instances a BPE may span two or more sides of an EC device. Some examples of angled bus bars are described in U.S. patent application Ser. No. 13/452,032, titled "ANGLED BUS BAR," and filed on Apr. 20, 2012, which is hereby incorporated by reference in its entirety. Typically, but not necessarily, the BPE is wide enough to accommodate the bus bar, but should allow for some space at least between the active EC device stack and the bus bar. In one embodiment, the BPE is substantially rectangular, the length approximating one side of the EC device and the width is between about 5 mm and about 15 mm, in another embodiment between about 5 mm and about 10 mm, and in yet another embodiment between about 7 mm and about 9 mm. As mentioned, a bus bar may be between about 1 mm and about 5 mm wide, typically about 3 mm wide. In embodiments where the BPE spans more than one side of the EC device, these widths apply to each side where the BPE is fabricated.

As mentioned, the BPE is fabricated wide enough to accommodate the bus bar's width and also leave space between the bus bar and the EC device stack (as the bus bar is only supposed to touch the first (lower) conductor layer). The bus bar width may exceed that of the BPE (and thus there is bus bar material touching both the first conductor layer and substrate (and/or diffusion barrier) on area 140), as long as there is space between the bus bar and the EC device stack (in embodiments where there is an L3 isolation scribe, the bus bar may contact the deactivated portion). In embodiments where the bus bar width is fully accommodated by the BPE, that is, the bus bar is entirely atop the first conductor layer, the outer edge, along the length, of the bus bar may be aligned with the outer edge of the BPE, or inset by about 1 mm to about 3 mm. Likewise, the space between the bus bar and the EC device stack is between about 1 mm and about 3 mm, in another embodiment between about 1 mm and 2 mm, and in another embodiment about 1.5 mm. Formation of BPEs is described in more detail below, with respect to an EC device having a first conductor layer that is a TCO. This is for convenience only, the first conductor layer could be any suitable conductive layer for an optical device, transparent or not.

To make a BPE in this example, an area of the first (lower) TCO is cleared of deposited material so that a bus bar can be fabricated on the TCO. In one embodiment, this is achieved by laser processing which selectively removes the deposited film layers while leaving the first TCO exposed in a defined area at a defined location. In one embodiment, the absorption characteristics of the first conductor layer and the deposited layers are exploited in order to achieve selectivity during laser ablation, that is, so that the EC stack materials deposited on the TCO are selectively removed while leaving the first TCO material intact. In certain embodiments, an upper portion (depth) of the first TCO layer is also removed in order to ensure good electrical contact of the bus bar, e.g., by removing any mixture of first TCO and the EC stack materials that might have occurred during deposition. In certain embodiments, when the BPE edges are laser machined so as to minimize damage at these edges, the need for an L3 isolation scribe line to limit leakage currents can be avoided—this eliminates a process step, while achieving the desired device performance results.

In certain embodiments, the electromagnetic radiation used to fabricate a BPE is the same as described above for performing edge deletion. The (laser) radiation is delivered to the substrate using either optical fiber or an open beam path. The ablation can be performed from either substrate side (also referred to as "glass side") or the EC stack side (also referred to as "film side") depending on the choice of the electromagnetic radiation wavelength. The energy density required to ablate the film thickness is achieved by passing the laser beam through an optical lens. The optical lens focuses the laser beam to the desired shape and size, e.g. a "top hat" having the dimensions described above, in one embodiment, having an energy density of between about 0.5 $J/cm^2$ and about 4 $J/cm^2$. In one embodiment, laser scan overlapping for the BPE is done as described above for laser edge deletion. In certain embodiments, variable depth ablation is used for BPE fabrication.

In certain embodiments, e.g. due to the selective nature of the absorption in an EC stack layer (e.g., film), the laser processing at the focal plane results in some amount (e.g., between about 10 nm and about 100 nm) of residue, e.g. tungsten oxide, remaining on the exposed area of the first (lower) conductor layer. Since many EC stack materials are not as conductive as the underlying first conductor layer, the bus bar fabricated on this residue does not make full contact with the underlying conductor, resulting in voltage drop across the bus bar to lower conductor interface. The voltage drop impacts coloration of the device as well as impacts the adhesion of the bus bar to the first conductor layer. One way to overcome this problem is to increase the amount of energy used for film removal, however, this approach results in forming a trench at the spot overlap, unacceptably depleting the lower conductor. To overcome this problem the laser ablation above the focal plane is performed, i.e. the laser beam is defocused. In one embodiment, the defocusing profile of the laser beam is a modified top hat, or "quasi top hat." By using a defocused laser profile, the power density delivered to the surface can be increased without damaging the underlying TCO at the spot overlap region. This method minimizes the amount of residue left in on the exposed first conductor layer and thus allows for better contact of the bus bar to the first conductor layer.

In some embodiments, one or more laser isolation scribes may be needed, depending upon design tolerances, material choice, and the like. FIG. 1C depicts top-views of three devices, 200a, 200b and 200c, each of which are variations on device 200 as depicted in FIGS. 1B, 1D, and 1E. Device 200a is similar to device 200, but includes L2 scribes that isolate first portions of the EC device along the sides orthogonal to the sides with the bus bars. Where such L2 scribes are used, the pre-deposition removal of the lower conductor (e.g., TCO) layer may be eliminated on the L2 edges.

In a particular embodiment, an L3 isolation scribe is performed on at least one of these edges in combination with pre-deposition removal of the first (lower) conductor layer. Device 200b is similar to device 200, but includes an L3 scribe isolating and deactivating a second portion of the device between the bus bar on the first conductor layer and the active region of the EC device stack.

Device 200c is similar to device 200, but includes both the L2 scribes and the L3 scribe. Although the scribe line variations in FIG. 1C are described in reference to devices 200a, 200b and 200c, these variations can be used for any of the optical devices and lites (e.g. in IGUs and/or laminates) of embodiments described herein. For example, one embodiment is a device analogous to device 200c, but where the edge deletion does not span three sides, but rather only the side bearing the bus bar on the second conductor (e.g., second TCO) layer (or a portion long enough to accommodate the bus bar). In this embodiment, since there are no edge delete portions on the two sides orthogonal to the bus bars (the right and left side of 200c as depicted), the L2 scribes may be closer to these edges in order to maximize viewable area. Depending upon device materials, process conditions, aberrant defects found after fabrication, etc., one or more of these scribes may be added to ensure proper electrical isolation of the first and second conductor layers (electrodes) and therefore EC device function. Any of these devices may have a vapor barrier applied prior to, or after, one or all of these scribes. If applied after, the vapor barrier is not substantially electrically conductive; otherwise it would short out the device's electrodes when filling the laser scribe trenches. The above-described edge tapering may obviate the need for such laser isolation scribes.

Referring again to FIGS. 1A and 1B, after forming the BPE, bus bars are applied to the device, a bus bar 2 on the exposed area (BPE) 135 of the first (lower) conductor layer (e.g., first TCO) and a bus bar 1 on the opposite side of the device, on the second (upper) conductor layer (e.g., second TCO), on a portion of the second conductor layer that does not have a first conductor layer below it, see 240. This placement of the bus bar 1 on the second conductor layer avoids coloration under the bus bar 1 and other associated issues with having a functional device under this bus bar 1. In this example, laser isolation scribes may not be necessary in fabrication of the device.

FIG. 1B indicates cross-section cuts Z-Z' and W-W' of device 200. The cross-sectional views of device 200 at Z-Z' and W-W' are shown in FIGS. 1D and 1E. The depicted layers and dimensions are not to scale, but are meant to represent functionally the configuration. In this depiction, the edge tapering of the first (lower) conductor layer is not shown. In this example, the diffusion barrier was removed when width A and width B were fabricated. Specifically, perimeter area 140 is free of the first conductor layer and the diffusion barrier; although in one embodiment the diffusion barrier is left intact to the edge of the substrate about the perimeter on one or more sides. In another embodiment, the diffusion barrier is co-extensive with the one or more material layers of the EC stack and the second (upper) conductor layer (thus width A is fabricated at a depth to the diffusion barrier, and width B is fabricated to a depth sufficient to remove the diffusion barrier). In this example, there is an overlapping portion, 240, of one or more material layers about three sides of the functional device. On one of these overlapping portions, on the second conductor layer (e.g., second TCO), the bus bar 1 is fabricated. In one embodiment, a vapor barrier layer is fabricated co-extensive with the second conductor layer. A vapor barrier is typically highly transparent, e.g., aluminum zinc oxide, a tin oxide, silicon dioxide, silicon oxynitride and mixtures thereof, amorphous, crystalline or mixed amorphous-crystalline. In this embodiment, a portion of the vapor barrier is removed in order to expose the second conductor layer for bus bar 1. This exposed portion is analogous to the BPE area 135, for bus bar 2. In certain embodiments, the vapor barrier layer is also electrically conductive, and exposure of the second conductor layer need not be performed, i.e., the bus bar 1 may be fabricated on the vapor barrier layer. For example, the vapor barrier layer may be ITO, e.g., amorphous ITO, and thus be sufficiently electrically conductive for this purpose. The amorphous morphology of the vapor barrier may provide greater hermeticity than a crystalline morphology.

FIGS. 1D and 1E depicts the EC device layers overlying the first (lower) conductor (e.g., TCO) layer, particularly the overlapping portion, 240. Although not to scale, cross section Z-Z', for example, depicts the conformal nature of the layers of the EC stack and the upper conductor (e.g., TCO) layer following the shape and contour of the lower conductor layer including the overlapping portion 240. Tapered TCO edges are not depicted in FIG. 1D or FIG. 1E.

FIG. 1D includes details of possible problematic issues overcome by certain embodiments described herein. The cross section Z-Z' in FIG. 1D has been modified for illustrative purposes to show details of a problem sometimes encountered with such overlapping configurations without having tapered edges of certain embodiments. Referring to FIG. 1D, the transition to overlap 240, where the upper device layers overlay the edge of the first conductor layer, e.g. depending upon the device materials and thickness of the layers, may form fissures, 700, as depicted in the expanded portion (left). It is believed that these fissures are due to the stress related to the upper device layers having to follow an abrupt transition over the edge of the first conductor layer (in this example). Fissures 700 may form along the edges of the device where the overlying layers cover such abrupt edges. These fissures may cause electrical shorting, as there is an exposed path between the first and second conductor layers, and ions may short the device as the ion conducting layer (or functional equivalent) is breached at the fissure. These shorts cause coloration aberrations and poor performance of the electrochromic device. Embodiments herein overcome this problem by tapering (sloping or otherwise modifying) the lower device layers about at least a portion of their edge, particularly the lower transparent conducting layer, so that the overlying layers will not encounter such stresses. This is referred to herein as "edge tapering." Although edge tapering is described in certain embodiments, other stress mitigation topology may be used such as edge rounding, stepping, and beveling. Also, combinations of stress mitigation topology may be used. Generally these are referred to collectively as "edge tapering."

Referring again back to FIG. 1D, the right side of FIG. 7 includes a detailed portion of the cross section Z-Z' illustrating a problem sometimes encountered with BPE formation. Specifically, during laser ablation of the bus bar pad expose area, upon which bus bar 2 resides in this figure, the laser may not ablate away the top layers or ablate the first (lower) conductor layer (e.g., first TCO) uniformly. Thus, there may be problematic issues with proper electrical connectivity between the bus bar and the lower conductor layer in area 705. These issues are described in more detail with reference to FIGS. 1F and 1G.

Figure 1F:
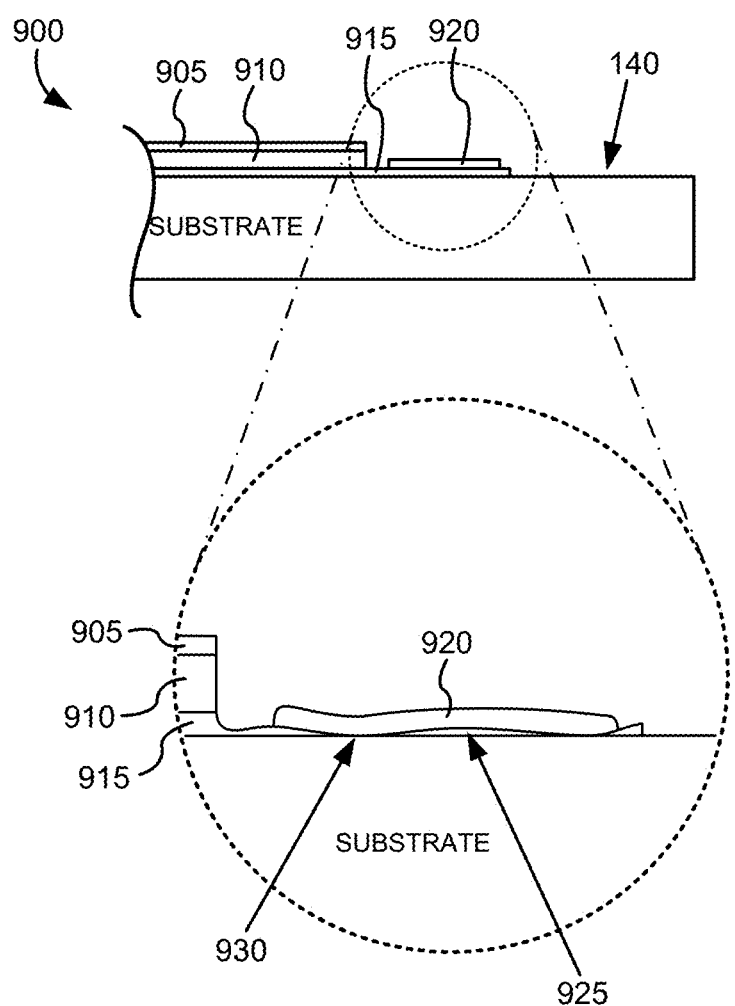
FIGS. 1F and 1G are drawings depicting problematic issues related to exposure of a lower conductor for bus bar application.

Referring to FIG. 1F, a cross section of an electrochromic device, 900, having a second (upper) transparent conductor layer 905, a device stack, 910, and a first (lower) transparent conductor layer, 915. On a BPE of the first conductor layer 915, is a bus bar, 920, e.g., a silver ink bus bar. In the lower portion of FIG. 1F, in detail, is shown a problem that may occur with the BPE portion of layer 915. Depending upon the device materials, laser settings, device state, etc., the BPE may not be of uniform thickness. In this example, the laser ablation was uneven, leaving areas, 930, where first conductor layer 915 was completely removed, and areas, 925, where first conductor layer 915 remains. Areas 930 prevent electrical conduction to the device stack due to cutting off electrical connectivity in the first conductor layer 915. Areas 930 typically span some portion of the BPE, if not all, and thus can be a problem.

Figure 1G:
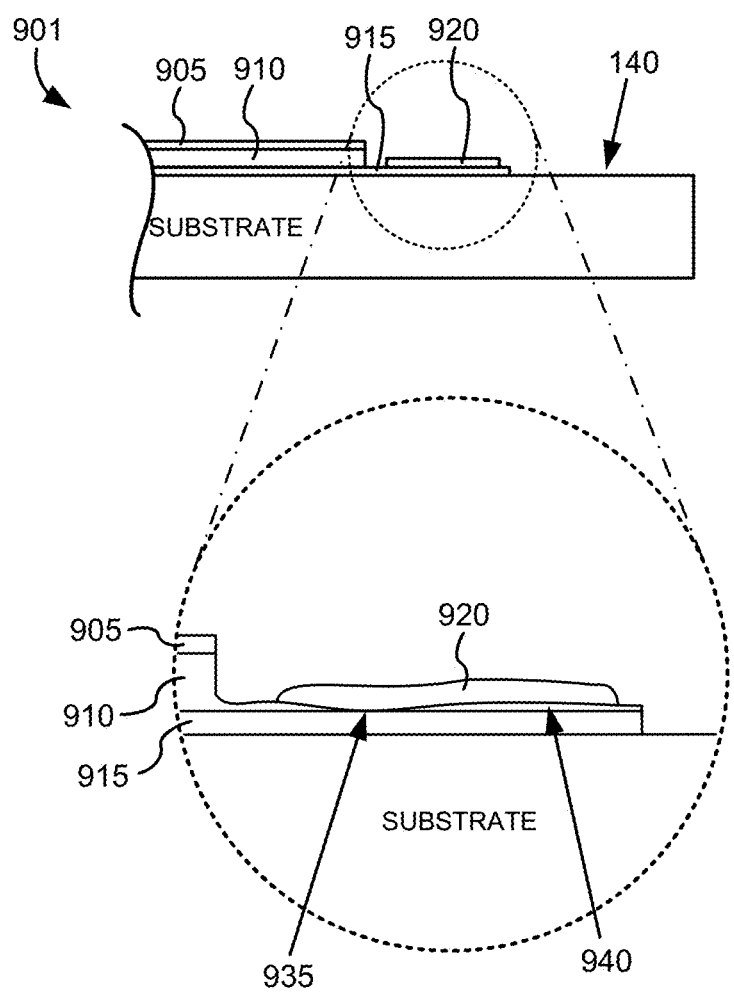

FIG. 1G shows another problem that may occur. If the laser does not ablate deeply enough, in this example through the device stack 910, then there may be poor electrical connectivity between first conductor layer 915 and the bus bar 920. In this example, there is electrical connectivity between the bus bar 920 and first conductor layer 915 in area 935, where the device stack 910 was penetrated by the laser during BPE, but a large area portion of the device stack 910 remains between bus bar 920 and first conductor layer 915 at area 940.

So, as illustrated in FIG. 1F, the laser may ablate too deeply, and as illustrated in FIG. 1G, the laser may not ablate sufficiently over the entire area of the BPE. This can happen, e.g., due to film absorption drift during laser ablation, both intra-device and inter-device. Methods described herein overcome these issues by applying varying laser ablation levels, e.g., along individual scribe lines during BPE fabrication. This is described in more detail in relation to FIGS. 7A-F.

In certain embodiments, various elements of a laser tool can be used to implement a laser pattern. The laser tool typically includes a scanner that can direct a laser beam/spot according to the laser pattern provided to the scanner. The laser tool positions the scanner in a particular location relative to the electrochromic device or other optical device work piece. In many cases, a programming code is provided to the laser tool to provide it with instructions to position the laser tool relative to the work piece while the scanner directs the laser beam/spot according to one or more laser patterns. In certain cases, this programming code may also be used to reposition the scanner after one pattern has been executed to direct the scanner as required for another laser pattern, thereby ensuring that the scanner performs both laser patterns at the correct portions of the work piece. The laser pattern or patterns received by the scanner are also instructions typically in the form of a programming code. The scanner uses the instructions defining the laser pattern or patterns to turn off/on and direct the laser beam according to the laser pattern or patterns. These various instructions may contain information regarding the timing and positioning of various processes/components.

The arrangement of overlapping device layers as well as BPE and other features may be along one or more sides of the device, depending upon the need. For example, an alternate design/configuration is described in detail in U.S. patent application Ser. No. 13/452,032, filed Apr. 20, 2012, and titled "ANGLED BUS BAR."

Figure 2:
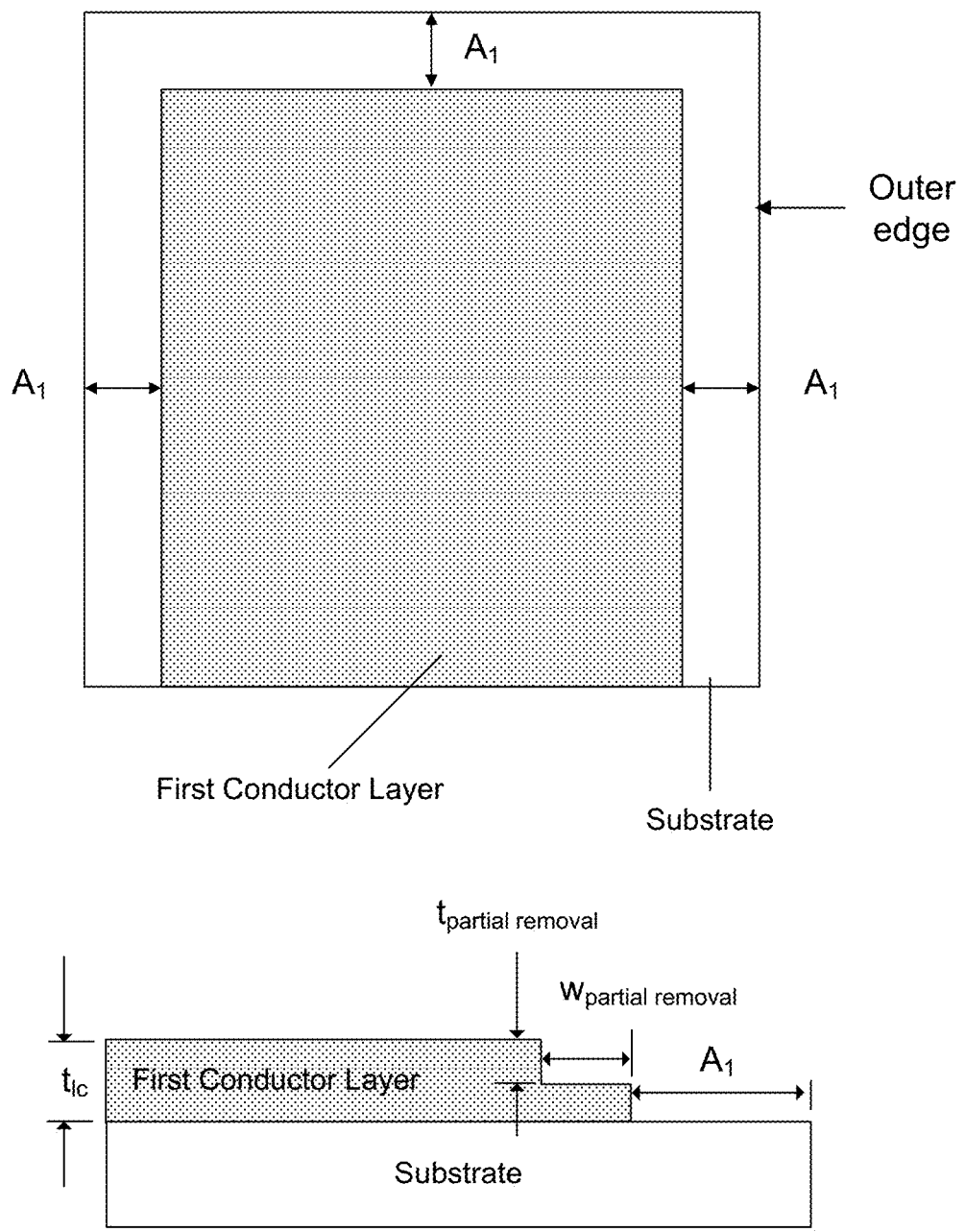
FIGS. 2 and 3 depict top and side views of an EC lite at steps of a fabrication method.

The top illustration of FIG. 2 is a top view of an EC lite after a PDLD operation has been performed on the outmost region of the perimeter of the substrate (along three sides in this example). The bottom illustration in FIG. 2 is a partial side view of the EC lite shown in the top view. The partial side view is of the bottom side of the EC lite in the top illustration. The PDLD operation performed may be similar to the one described in detail with respect to step 105 in FIG. 1A. Before the PDLD operation, a substantially transparent substrate with a first (lower) conductor layer is provided. The thickness of the first conductor layer before the PDLD operation is $t_{lc}$. Although an EC lite is used in this illustrated embodiment, other optical device lites can be used. FIG. 2 does not depict a diffusion barrier layer, but this may be present.

In the PDLD operation performed on the EC lite of FIG. 2, the first conductor layer is removed in a region along three sides and to the outer edge of the substrate. In this illustrated example, the thickness, $t_{lc}$, of the first conductor layer is removed in a region having a width, $A_1$, to the outer edge of the substrate. In the illustrated example, the $A_1$ is 13.5 mm and the $t_{lc}$ is 400 nm (not to scale) for illustrative purposes.

In other PDLD fabrication operations, which may be similar to one or more of the steps 107, 108, and 109 described in detail with reference to FIG. 1A, the first conductor layer may be tapered along its edge on one or more sides. The first conductor layer of the EC lite shown in FIG. 2 has been tapered (in this case a step profile) along the same three sides which had a width, $A_1$, removed. In FIG. 2, the taper is a stepwise taper with a single step where material has been partially removed from the first conductor layer. Tapering the edge of the first conductor layer may help to relieve stress in the overlying device layers in the transition region between being on top of the first conductor layer to being on top of the substrate. That is, when device layers are deposited over an abrupt edge (a "cliff" of sorts), as described above in relation to FIG. 1D, stresses in this transition region may allow the device layers to crack, which deteriorates performance of the device. The width of the partial removal region is $w_{partial\ removal}$. This is illustrated as 500 μm (not to scale), but may have other widths. In this illustrated example, the depth of the step of the partial removal is $t_{partial\ removal}$, which is illustrated as 250 nm+−50 nm (not to scale), but may have other depths, depending upon the thickness of the TCO. The dimensions described in reference to FIG. 2 and in other figures are illustrative and other dimensions can be used. In some cases, tapering operations may be considered optional operations; for example, certain device layers may not be as susceptible to stresses imparted by an abrupt transition when overlying a lower conductor's non-tapered edge.

After the PDLD operations are performed, a deposition process deposits one or more layers of the electrochromic device on the lite. The layers are deposited over a portion or the entire surface of the lite. In certain embodiments, the EC stack and/or upper conductor layer may be deposited. In some embodiments, the EC stack is deposited. The deposition process may be similar to step 110 described with reference to FIG. 1A. The top illustration in FIG. 3 is a top view of the EC lite after undergoing a deposition process that deposits an electrochromic (EC) stack over the surface of the EC lite shown in FIG. 2.

After the deposition process, the EC lite undergoes a post deposition LED (Post-LED) process in a region (e.g., post-LED region in FIG. 3) along one or more sides and to the outer edge of the substantially transparent substrate. In some cases, the post-LED process removes material along all sides of the EC lite. This post-LED process may be similar to step 115 described with reference to FIG. 1A.

Figure 3:
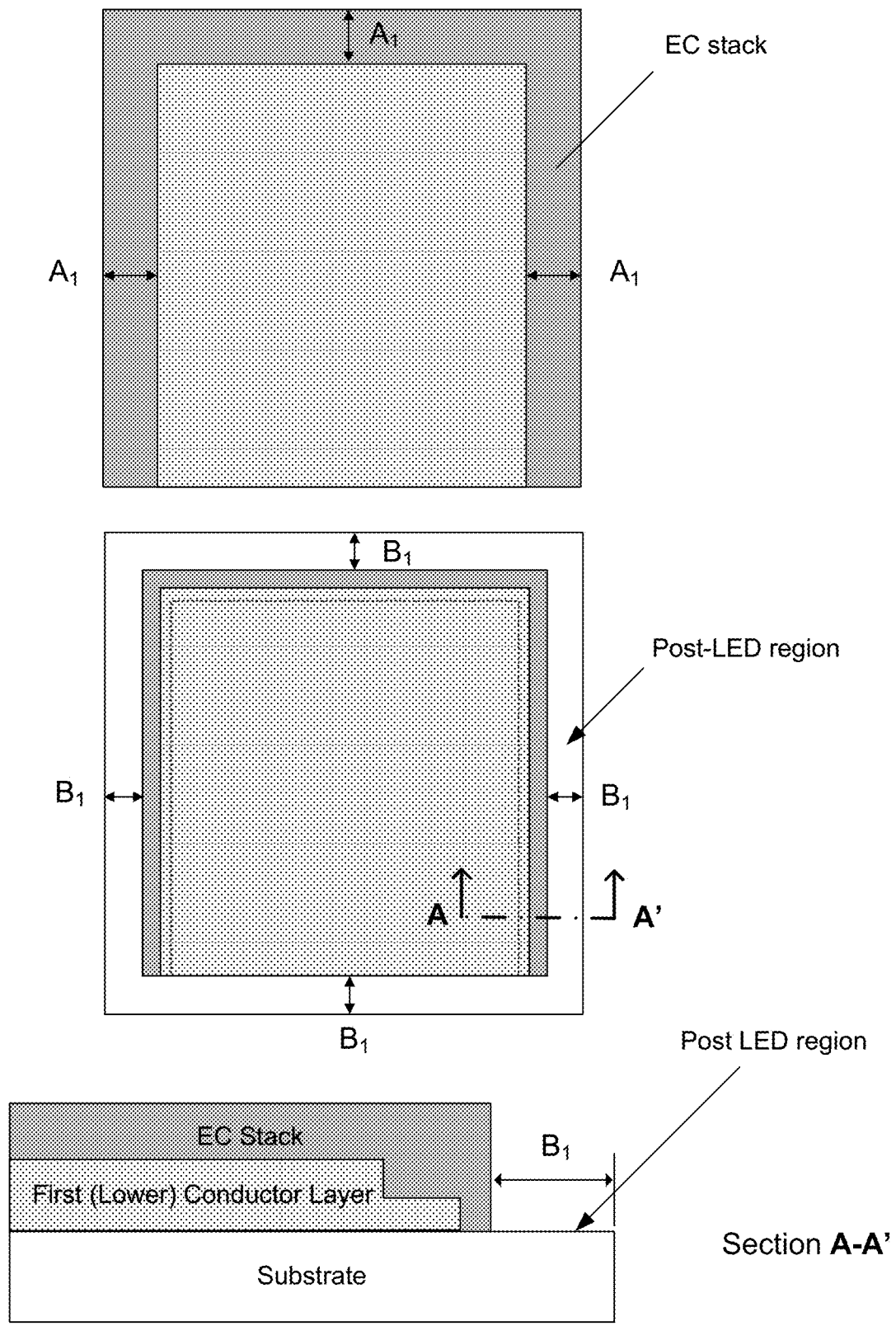

In the illustrated example shown in FIG. 3, the middle illustration is a top view of the EC lite shown in the top illustration after a post-LED process is performed along all four sides to the edge of the substantially transparent substrate. The width of the post-LED region is a width $B_1$. For example, in certain embodiments, $B_1$ is about 10 mm±2 mm, but other widths apply. The bottom illustration in FIG. 3 is a cross-sectional view A-A' of the EC lite of the middle illustration after the post-LED process has removed the thickness of the material layers in the post-LED region.

Figure 4:
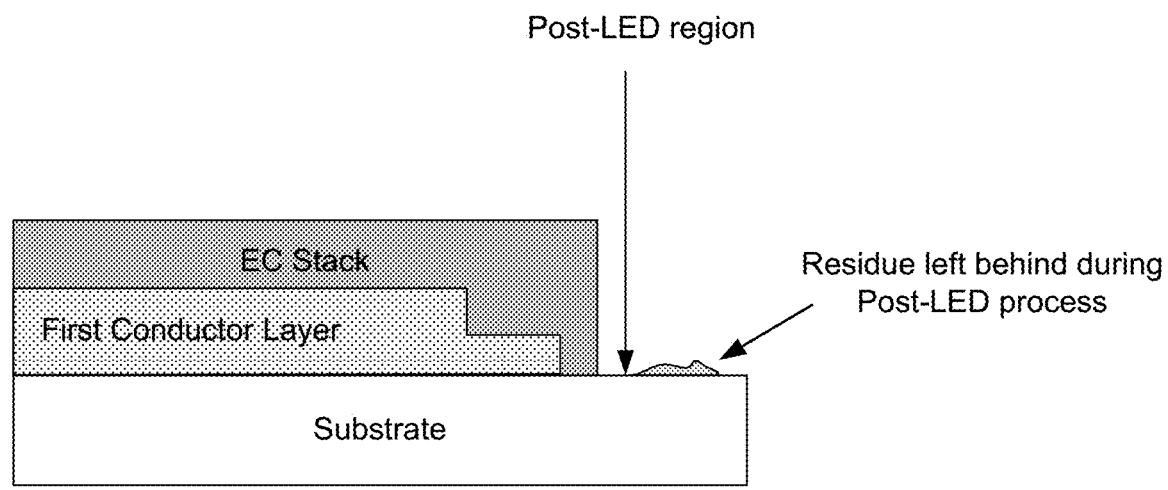
FIG. 4 is an illustration of residue left in a post-LED region.

The inventors have found that in certain instances, a post-LED process can leave a residue material (e.g., $WO_x$) behind in the post-LED region. That is, if the first conductor layer is removed about a perimeter prior to fabrication of the optical device layers thereon, then later removal of the device layers may leave residues of those device layers on the substrate. These residues can interfere with making a good seal, e.g. with an IGU spacer and sealant. FIG. 4 is a cross-sectional view through of an EC lite after a post-LED process where a residue of material remains in the post-LED region. It has been found that if the first conductor layer (e.g., first TCO) is first removed from the perimeter region, then the device layers deposited thereon, and a post-LED process performed, the process is not efficient in removing residues of the optical device layers, particularly tungsten oxide based residues and metal oxide residues containing lithium. Such residues, e.g. due to their hygroscopic nature, convert into a gel by combining with moisture. As a result, this material may provide a pathway for water ingress into the active area of the electrochromic device, even after sealing the EC lite into an insulated glass unit (IGU); they interfere with the seal integrity. If water passes to the EC device, the material layers in the device may corrode or otherwise degrade, which can result in premature failure of the device. The resulting degradation may occur over time (e.g., 2 years, 6 years, etc.) depending on, e.g. the amount of moisture to which the IGU is exposed.

Narrow PDLD Process (NPDLD)

Certain embodiments described herein include improved methods of fabricating optical devices that address the above described issues with EC device layer residues remaining on the area where, e.g. an IGU spacer is used to make its seal with the substrate. What are termed "narrow pre-laser edge deletion" methods or "NPDLD" methods are used. For example, rather than removing a perimeter portion of the first conductor layer (e.g., TCO) to the substrate edge before depositing device layers thereon, a perimeter portion of the first conductor layer at the edge is left on, then the device layers are fabricated thereon, and only then is the perimeter portion of the first (lower) conductor layer at the substrate edge removed along with the other device layers. This results in an unexpectedly cleaner removal of the aforementioned residues; if present at all, they are de minimus. This process can be thought of as an in situ mask, where the perimeter edge portion of first conductor layer is removed only after the other device layers are deposited thereon. In this way, when the perimeter edge portion of the first conductor layer is removed, it takes the overlying device layers with it, as a conventional mask would do. Thus, the overlying device layers never make contact with the substrate and are more easily removed therefrom by virtue of the underlying first conductor layer being removed along with the overlying layers.

Thus, certain embodiments relate to improved methods of fabricating optical devices that comprise a NPDLD process that removes a "narrow" strip of lower conductor layer along a region at a distance away from the outer edge of the substantially transparent substrate. The term "narrow" in this instance is used as a naming convention only, as the strip of material removed is generally not as wide as a strip removed in a conventional PDLD might be; however, this is not necessarily the case. As mentioned above, an NPDLD operation removes a strip of material from the first conductor layer along one or more sides of the substantially transparent substrate. In some cases, the region is removed along a side to the outer edge of an adjacent side such as shown in FIG. 1B. Removing this strip of material away from the outer substrate edge, leaves a corresponding pad of first (lower) conductor layer along those one or more sides. While not wishing to be bound by theory, it is believed that since the first conductor layer (e.g., TEC) typically has substantially homogenous optical properties, the material in this perimeter pad can effectively absorb laser energy during the post-LED process. Due to this effective absorption of laser energy, the pad will "lift off" from the substrate interface (i.e., interface between substrate and first conductor layer) in the post-LED process and take with it any device layers deposited over the pad (e.g. EC device layers). As described above, the pad of the first conductor layer about the perimeter edge can be thought of as an in situ mask. This "lift off" of materials from the substrate interface can result in the device material layers being effectively removed without leaving residue in the post-LED region. Thus the NPDLD operation enables a cleaner post edge deletion process and can be considered a component of an improved LED process.

In certain embodiments, improved fabrication methods with the NPDLD process can enable effective removal of materials from the substrate interface in the post-LED region while leaving little to no residue behind on the substrate. Since the residue material has been effectively removed, there is little to no material left behind to potentially create a pathway for water ingress into the active area of the EC device, which may avoid the corrosion problems mentioned above. Thus, improved fabrication methods comprising the described narrow LED process of embodiments may increase performance and reliability of the fabricated optical device, due to improved sealing e.g. in an IGU construct or laminate construct.

Figure 5A:
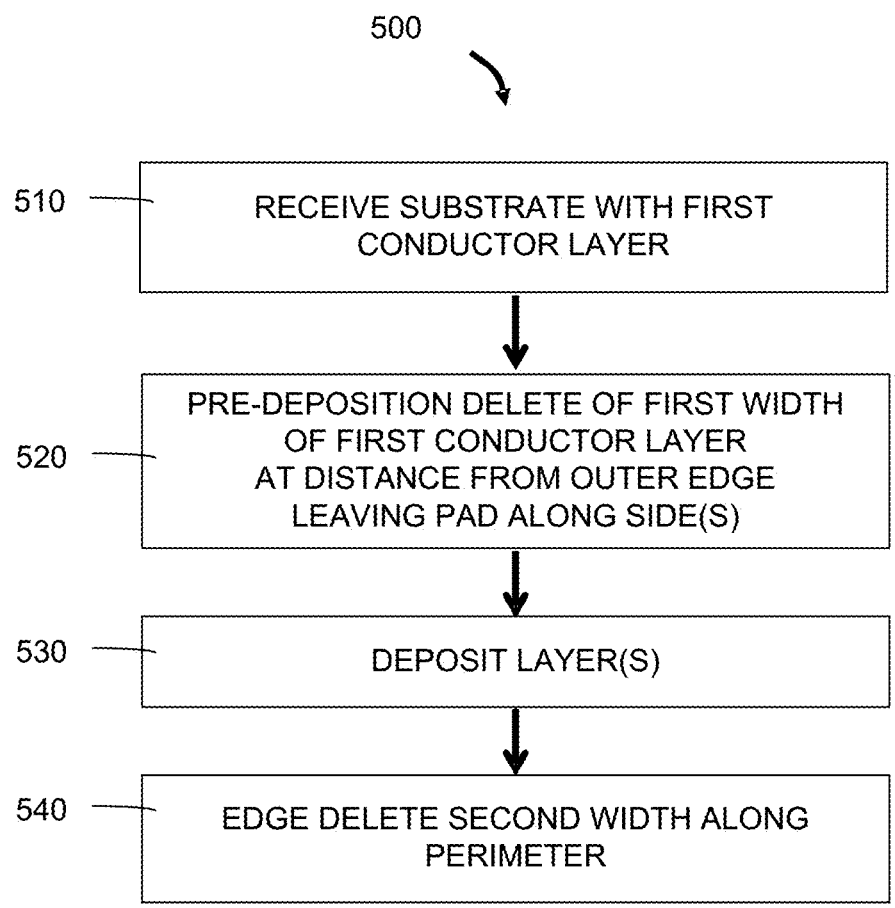
FIG. 5A is a flowchart of a process flow describing aspects of a method of fabricating an optical device that uses a narrow pre-deposition LED operation(s), according to certain embodiments.
Figure 5B:
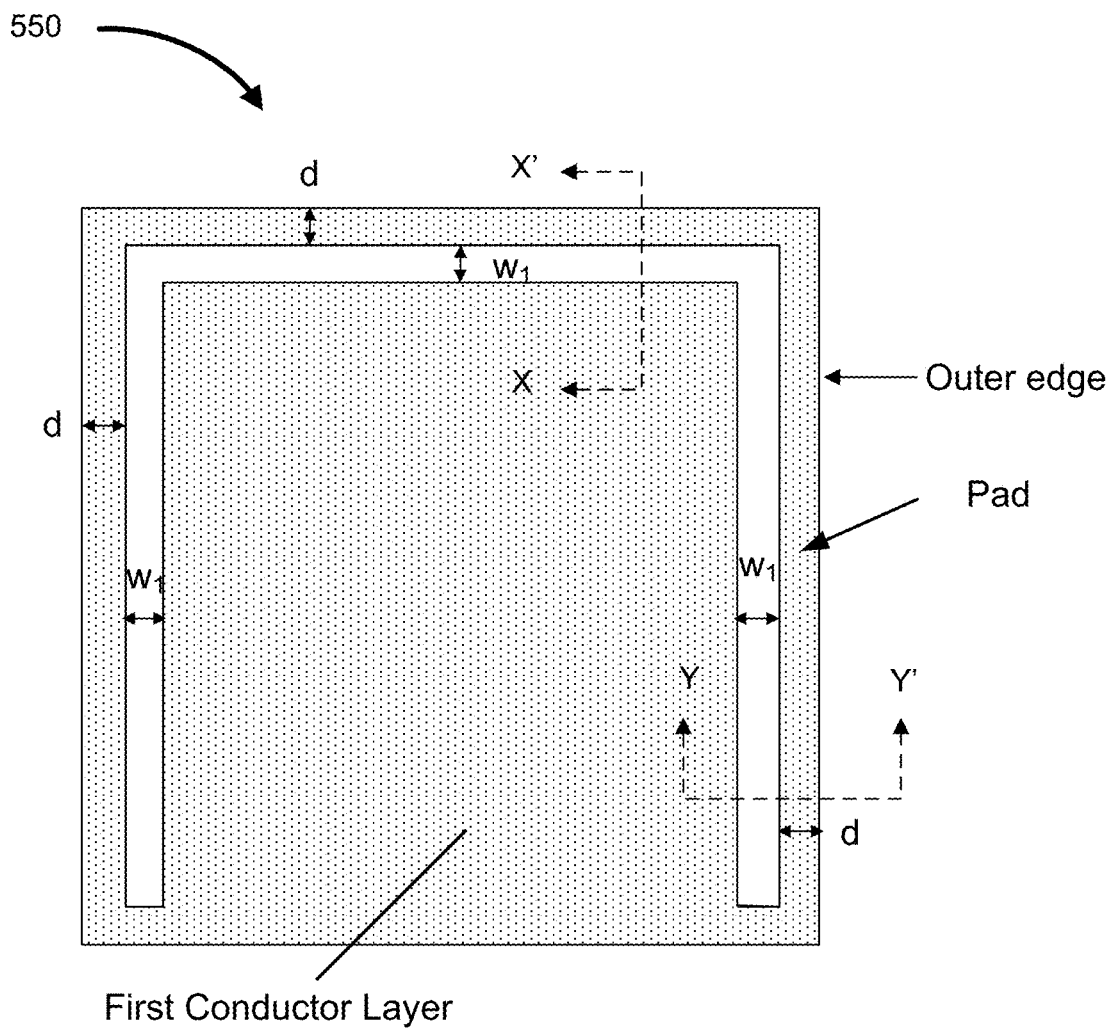
FIG. 5B depicts top and cross sectional views after a NPDLD operation, according to embodiments.
Figure 5B:
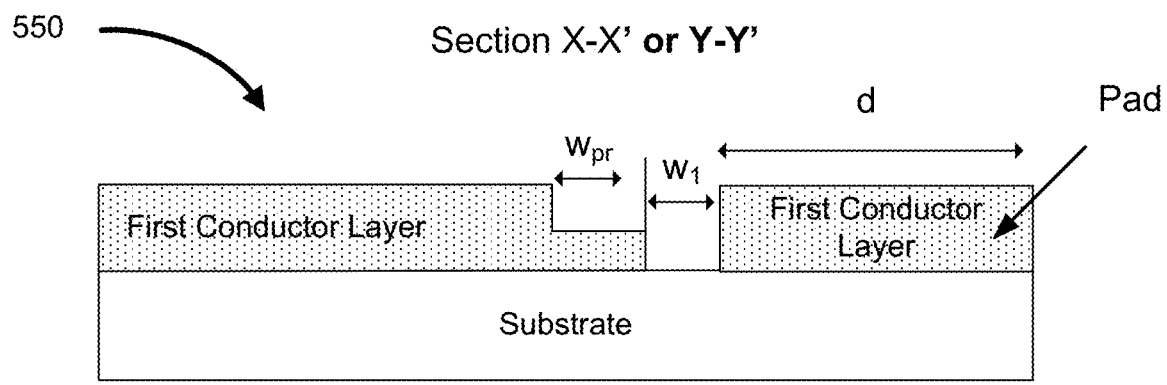
Figure 5C:
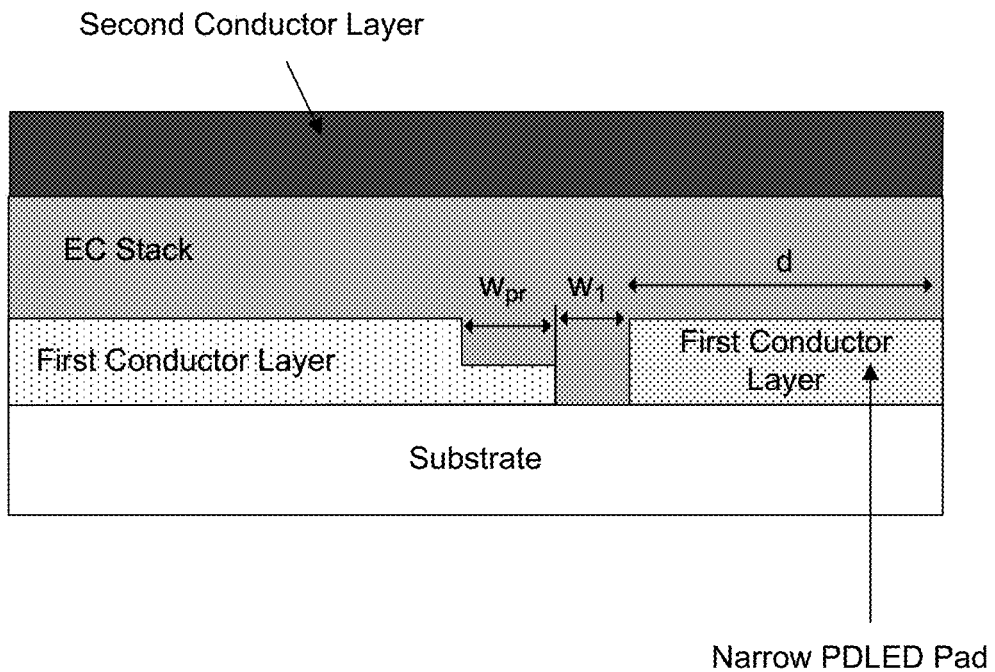
FIG. 5C depicts cross sectional views of illustration of FIG. 5B after depositing layers of the optical device and post edge deletion process respectively, according to embodiments.
Figure 5C:
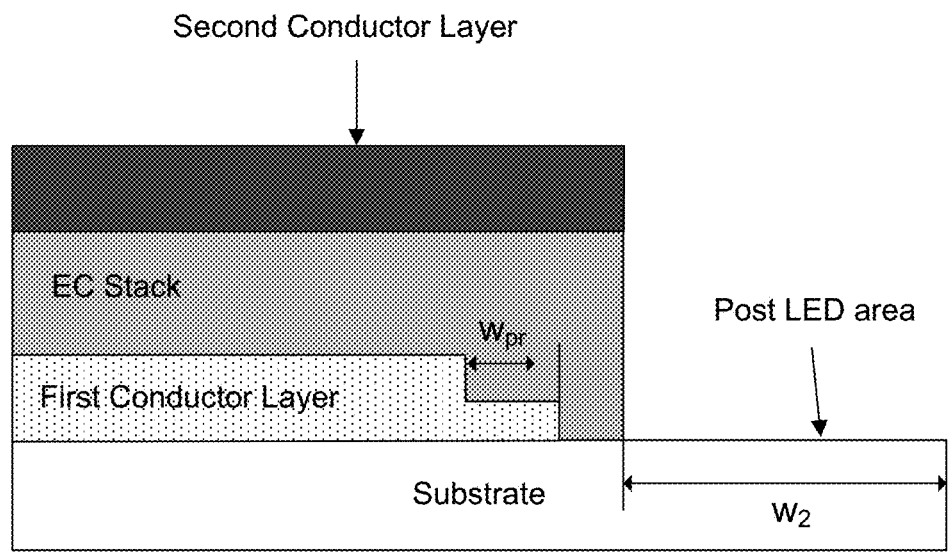

FIG. 5A is a process flow, 500, describing aspects of an improved method of fabricating an optical device (e.g., electrochromic device) with the NPDLD process An exemplary optical device 550 described in relation to FIGS. 5B-C is used to illustrate the process flow. The optical device 550 is disposed over a substantially transparent substrate (e.g., glass). Although the optical device is a rectangular device, the process flow 500 can apply to any shape.

At step 510, a substantially transparent substrate with a first conductor layer disposed thereon is received, for example, in a laser tool. Next, a NPDLD process is performed (step 520). At step 520, a NPDLD operation performs a pre-deposition deletion (removal) of a first width, $w_1$, of the first conductor layer at a distance from the outer edge and on one or more sides of the substrate. This first width, $w_1$, is typically, but not necessarily, a uniform width. In many cases, the entire thickness of the first conductor layer is removed in this first width. Removing this first width of first conductor layer at a distance from the outer edge, leaves a pad of first conductor layer remaining to the outer edge. In some embodiments, the deleted portion (region) is along all but one side of the substrate. In other embodiments, the deleted region is along one side of the substrate. More generally, the deletion is along between about 50% and about 90% of the perimeter of the substrate. In certain embodiments, the deletion is along between about 50% and about 75% of the perimeter of the substrate. For example, for a round substrate, the NPDLD operation may remove material from about 50% to about 75% of the circumference. For a square substrate, a three sided NPDLD process might remove material from about 75% of the perimeter. For other rectangular substrates, depending upon from which sides the NPDLD operation is performed, one might remove material from about 90% of the perimeter. For example, with a substrate that is 2'×10', and where material is removed from three sides, one might remove material from the two short sides and one long side, e.g. from about 14' of the 24' perimeter, or about 58% of the perimeter. In another example with the same 2'×10' substrate, if one were to perform NPDLD about two long sides and one short side, then the removal would be from about 22'/24' or about 92% of the perimeter. Generally, for rectangular substrates, when removing material from three sides, the two shorter sides and one long side are used. In this way, opposing bus bars are fabricated along the longer sides, which leaves a shorter distance between the bus bars and thus enables faster switching.

In certain cases, this NPDLD deletion may remove the first conductor layer, and also a diffusion barrier, if present. If the diffusion barrier is present, the pad will include the first conductor layer and the diffusion barrier. In one case, the substrate is glass and includes a sodium diffusion barrier and a lower transparent conducting layer thereon, e.g., a tin-oxide based transparent metal oxide conducting layer. Typically, the material is deleting using laser ablation.

Although not shown, an optical polishing step may occur between step 510 and 520 in some cases. The optional polishing step may be similar to step 101 described with reference to FIG. 1A.

As depicted in the top view of the top illustration of FIG. 5B, typically but not necessarily, the NPDLD operation leaves a pad of first conductor layer (e.g., TCO) about the entire perimeter edge. This is done so that when that perimeter edge portion of the first conductor layer is removed in the post-LED process, there are no residues remaining about the entire perimeter, and thus the perimeter sealing is improved about the entire perimeter. In certain embodiments (e.g. see FIG. 5E) some first conductor layer may be removed from small areas about the perimeter edge.

The top and bottom illustrations of FIG. 5B are top and side views respectively of a first conductor layer of an optical device (e.g. electrochromic device) disposed over a substrate that has undergone a NPDLD operation similar to the one described with reference to FIG. 5A at step 520. After the NPDLD operation according to 520, a first width, $w_1$, of lower conductor layer is removed along three sides at a distance, d, from the outer edge of the substrate. This distance, d, defines the width of the pad. A second width, $w_2$, is described below with reference to a post-LED operation. In FIG. 5B, $w_1$, is about 4 mm and the distance, d, is about 10 mm.

The top illustration in FIG. 5B indicates the cross-sections X-X' and Y-Y' of substrate and first conductor layer of the device 550 after the NPDLD operation. The lower illustration is a depiction of either cross sectional view X-X' or Y-Y' of the device 550 of the top illustration.

In FIG. 5B, there is a stepwise tapered portion of the first conductor layer, similar to the stepwise portion described with reference to the bottom illustration in FIG. 4. This stepwise tapered portion may be formed in the optional operations 107, 108, and 109 described in detail with reference to FIG. 1A. Although not shown, the method illustrated by the flowchart in FIG. 5A may include one or more of the optional steps 107, 108, and 109 of FIG. 1A. The width of the partial removal region is $w_{pr}$. This is illustrated as 500 μm, but may have other widths. In this illustrated example, the depth of the step of the partial removal is illustrated as 250 nm+−50 nm, but may have other depths. The tapered portion and tapering operations are optional.

In some embodiments, the distance or width of the pad, d, is about 10 mm. In some embodiments, the distance or width of the pad, d, is in the range of about 1 mm to about 10 mm. In some embodiments, the distance or width of the pad, d, is about 5 mm. In some embodiments, the distance or width of the pad, d, is in the range of about 5 mm to about 10 mm.

In some embodiments, the width, $w_1$, may be about 4 mm. In some embodiments, the width, $w_1$, may be less than 4 mm. In some embodiments, the width, $w_1$, may be in the range of about 1 mm and about 4 mm. In some embodiments, the width, $w_1$, may be in the range of about 1 mm to about 10 mm. In some embodiments, the width, $w_1$, may be about 1 mm. In some embodiments, the width, $w_1$, may be about 2 mm. In some embodiments, the width, $w_1$, may be about 3 mm.

In some embodiments, the width, $w_1+w_{pr}$, may be about 4 mm. In some embodiments, the width, $w_1+w_{pr}$, and/or $w_{pr}$, may be less than 4 mm. In some embodiments, the width, $w_1+w_{pr}$, and/or $w_{pr}$, may be in the range of about 1 mm and about 4 mm. In some embodiments, the width, $w_1+w_{pr}$, and/or $w_{pr}$, may be in the range of about 1 mm to about 10 mm. In some embodiments, the width, $w_1+w_{pr}$, and/or $w_{pr}$, may be about 1 mm.

Where the illustrated first width, $w_1$, second width, $w_2$, $w_{pr}$, and/or distance, d, are not uniform, their relative magnitudes with respect to each other described in terms of their average width.

Referring to FIG. 5A, certain layers of the optical device are deposited (step 530). In EC device embodiments, an electrochromic stack and/or an upper conductor layer (e.g., a transparent conducting layer such as indium tin oxide (ITO)) may be deposited. The layers may be deposited over a portion or the entire substrate. In certain illustrated cases, the depicted coverage is substantially the entire substrate, but there could be some perimeter masking due to a carrier that holds the glass in place with some edge support and/or clamping mechanism.

The top illustration in FIG. 5C may be a cross-sectional view of the device 550 of FIG. 5B after an layers of the optical device have been deposited over the entire substrate in the step 530 of FIG. 5A.

Referring to FIG. 5A, at step 540, a post-LED operation is performed to delete a second width, $w_2$, to the outer edge of the substrate. In some embodiments, the second width, $w_2$ may be at least the distance, d, of width of the pad. In this post-LED operation, electromagnetic radiation (e.g., laser energy) is applied to the pad and/or a region surrounding the pad. Since the pad has substantially homogeneous properties, it readily absorbs the energy and lifts off the substrate interface removing the pad and any material deposited thereon in step 530. In this post-LED operation at step 540, materials are removed from the substrate at the region of the pad.

The top illustration in FIG. 5C is a cross sectional view (e.g., X-X' or Y-Y') of the top illustration of FIG. 5B after deposition of an optical device, in this example, an EC stack (e.g. electrochromic layer, ion conductor layer and counter electrode layer) and a second (upper) conductor layer (e.g. ITO). The bottom illustration is a cross sectional view after a post-LED operation removing a width, $w_2$, in a post-LED region. In FIG. 5C, $w_2$ is 10 mm. In many cases, the second width, $w_2$, of the post-LED region is at least the distance, d, across the pad. By virtue of including the first conductor layer in the post-LED removal, a cleaner glass surface is exposed for the secondary seal of the IGU or corresponding sealing area for an adhesive in a laminate construction. The bottom illustration in FIG. 5C may be a cross-sectional view after post edge deletion operation in step 540.

Although not shown in FIG. 5A, the illustrated method of fabricating the optical device may also comprise one or more of the steps of 120 (bus bar pad expose operations) and 125 (bus bar application operations) described with reference to FIG. 1A.

In embodiments, NPDLD operation(s) remove a first width of first conductor layer at a distance, d, from the outer edge of the substrate to leave a pad (i.e., leaving a width, d, of the first conductor layer) to the outer edge of the substrate. In certain aspects, the pad may define or lie within the post-LED region (i.e. width of material removed by the post-LED operation). That is, lift off of the pad in the post-LED operation will remove the pad and any material layers on the pad. Thus, the post-LED region removed in the post-LED operation will typically be at least the width of the pad (distance, d).

Although the widths of material removed in certain deletion processes are shown or described as having a constant width around in multiple sides of the substrate, these widths are illustrative. It is understood that the widths removed along different sides may vary.

Figure 5D:
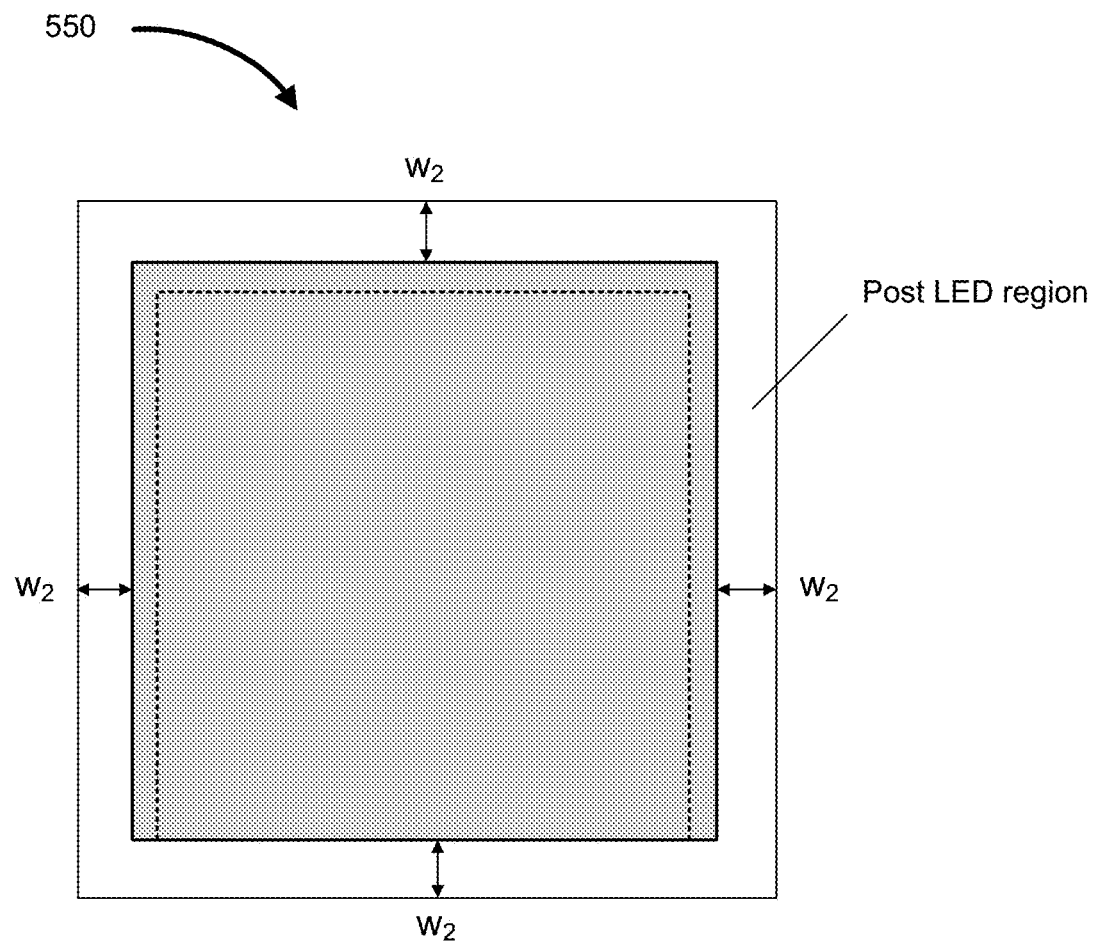
FIG. 5D depicts a top view of the device of FIG. 5C after post edge deletion operation, according to an embodiment.

FIG. 5D depicts a top view of the device 550 of the bottom illustration in FIG. 5C after post edge deletion operation in step 540.

Figure 5E:
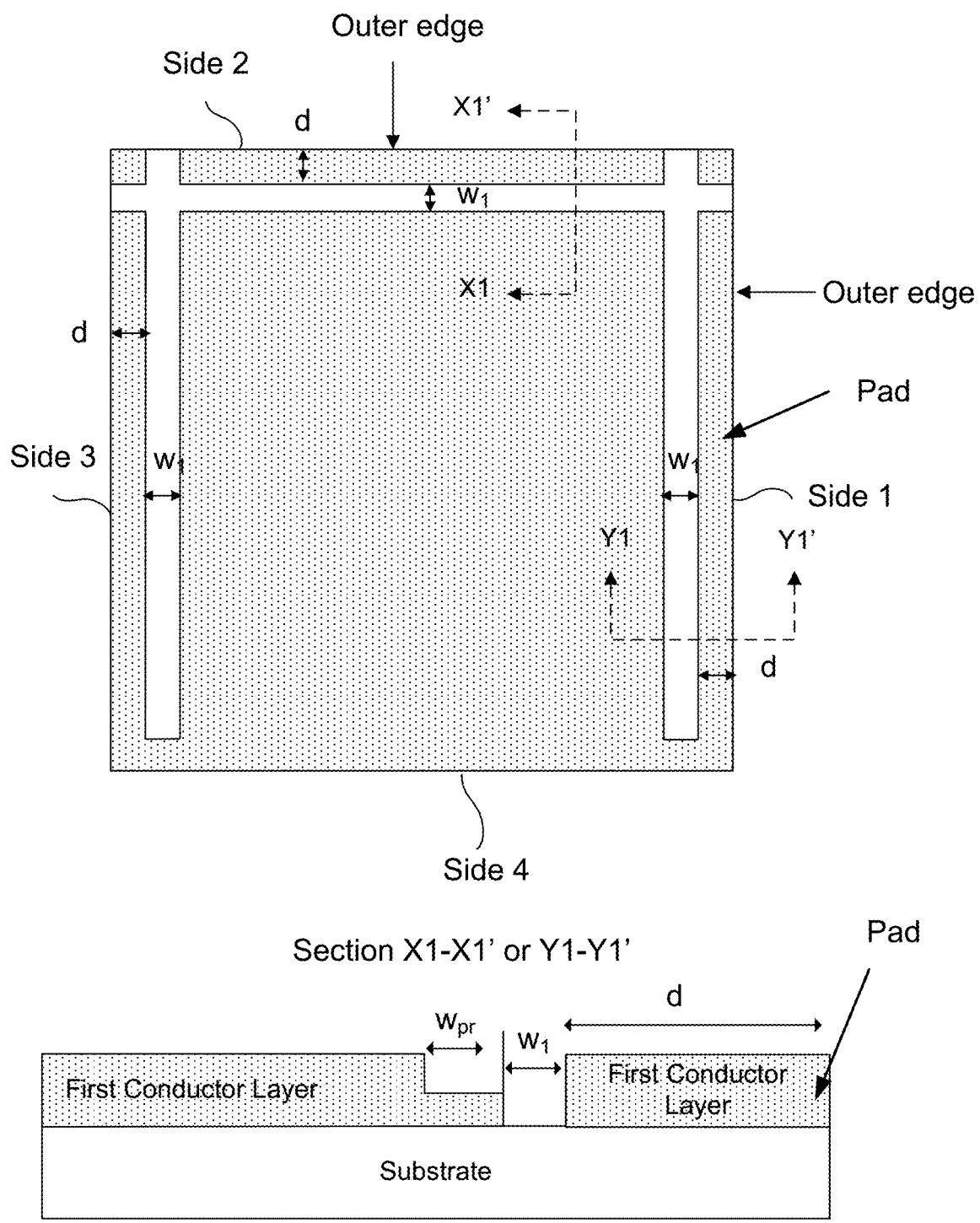
FIG. 5E depicts top and cross sectional views after a NPDLD operation, according to embodiments.

FIG. 5E depicts a top view (top illustration) and a cross sectional views (lower illustration) of a first conductor layer disposed over a substrate after a NPDLD operation, according to embodiments. The NPDLD operation is similar to the one described with reference to FIG. 5A at step 520. After the NPDLD operation according to 520, a first width, $w_1$, of the first conductor layer is removed along three sides (side 1, side 2, and side 3) at a distance, d, from the outer edge of the substrate. The PDLD operation removes the material along each of the sides 1 and 3 to the outer edge of the adjacent side 2. In FIG. 5E, $w_1+w_{pr}$, is about 4 mm and the distance, d, is about 10 mm.

Figure 6:
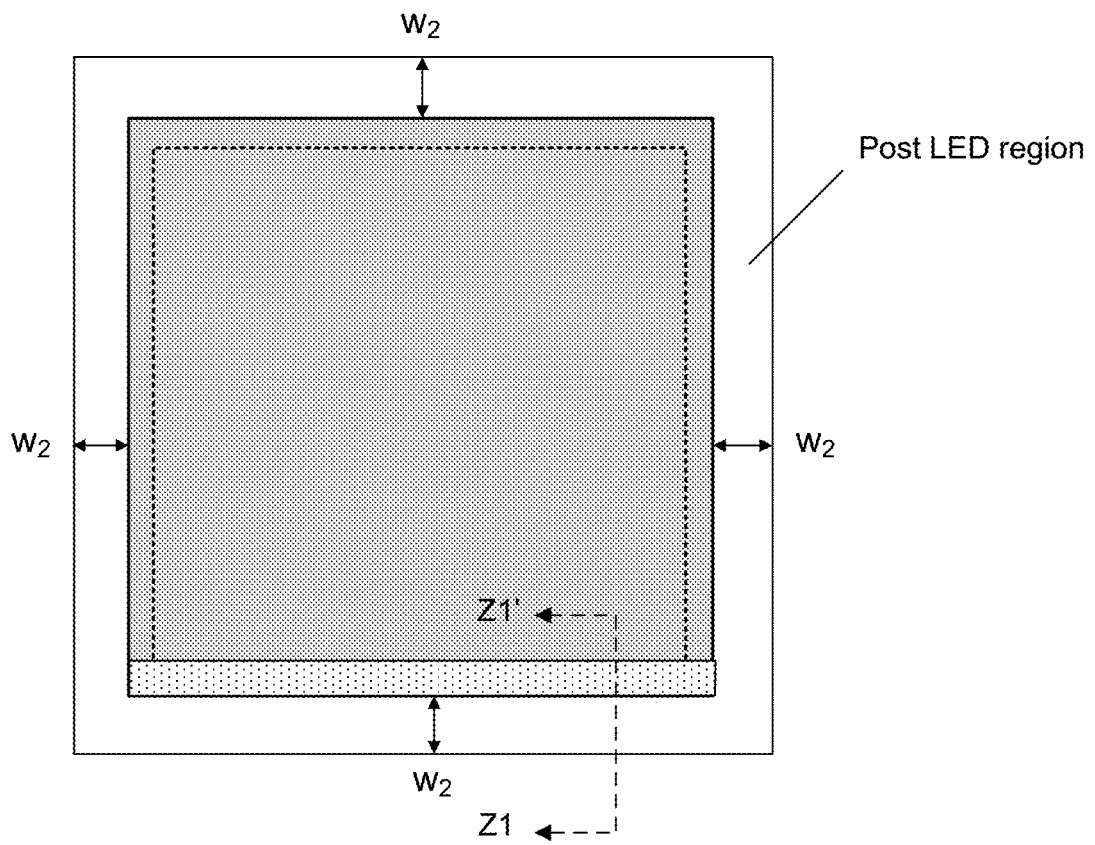
FIG. 6 depicts a top view and a side view after a BPE operation, according to an embodiment.
Figure 6:
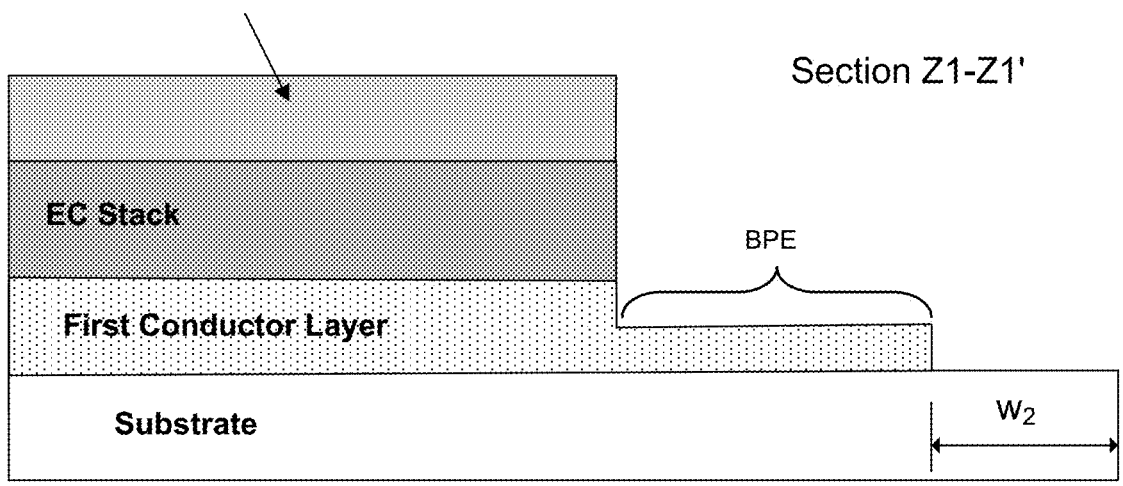

FIG. 6 depicts a top view (top illustration) and a cross-section Z1-Z1' (bottom illustration) after a BPE operation is performed on the device shown in FIG. 5C, according to embodiments. After the BPE operation, a bus bar can be applied to the exposed pad of the lower conductor. Other examples of devices after a BPE operation are shown with respect to FIGS. 7A-7F.

Figure 7A:
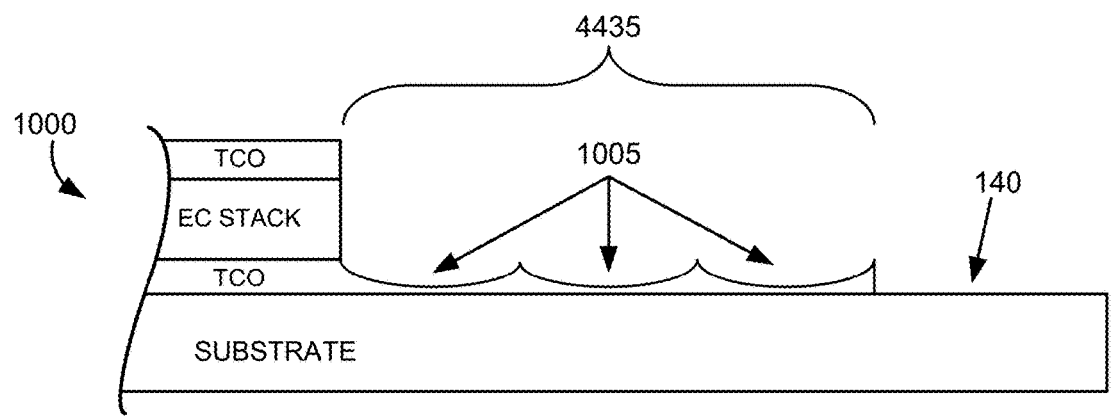
FIGS. 7A through 7F are drawings depicting embodiments for improved bus bar pad exposure, according to embodiments.

FIG. 7A depicts a cross sectional portion of an electrochromic device, 1000. The lower TCO is ablated in areas 1005 along one side to form a BPE, 4435. In this example, each of three areas 1005 is ablated with a defocused laser such that the cross section is concave has depicted. In this example, each of the scribe lines is made at the same laser fluence level (power density). Also, no overlap of the laser ablations was used, so that there are raised regions (in this case ridges) of the TCO material remaining between adjacent ablation lines. This is one example of using laser ablation of an overlying material down to an underlying conductor layer using varying laser ablation levels along a plurality of individual scribes. There are essentially three "knobs" for achieving variable ablation depth: pulse duration, fluence level and overlap of laser spot and/or pattern (line, shape formed by positioning of individual spots). In certain embodiments 100% overlap is used, e.g., multiple shots on a single spot location or multiple lines across the same area. Embodiments herein for achieving varying ablation depth use any one of these or any combination thereof.

One embodiment is a method of fabricating a BPE, the method comprising laser ablation of overlying material down to an underlying TCO layer using varying laser ablation levels along a plurality of individual scribe lines during fabrication of the BPE. In one embodiment, each of the individual scribe lines, of the plurality of scribe lines, is scribed using a quasi top hat at the same fluence level. Other patterns, besides lines, may be used so long as there is varying ablation depth. For example, a laser spot may be applied in a checkerboard pattern, with or without overlap of adjacent spots, where individual spots apply different pulse times to achieve varying ablation depth. In certain embodiments, at least two individual scribe lines, of the plurality of scribe lines, are scribed using a different fluence level for each line. Such embodiments are described in more detail below.

Figure 7B:
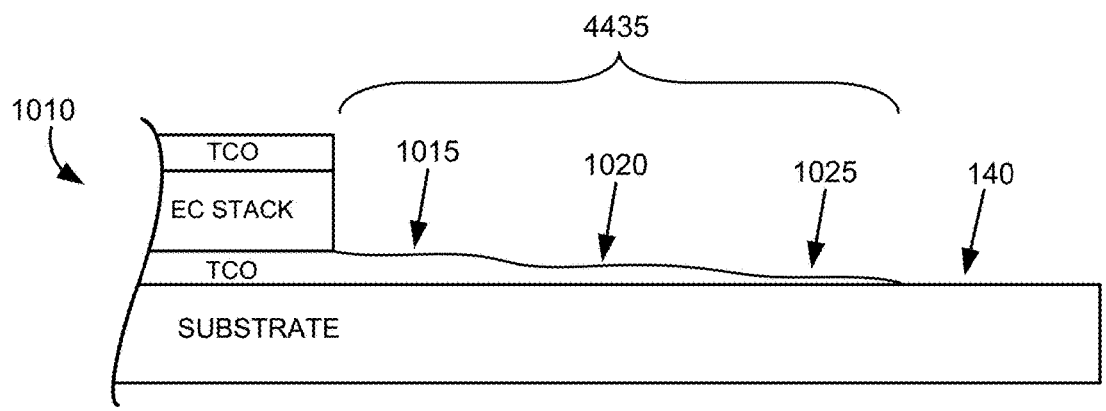
Figure 7C:
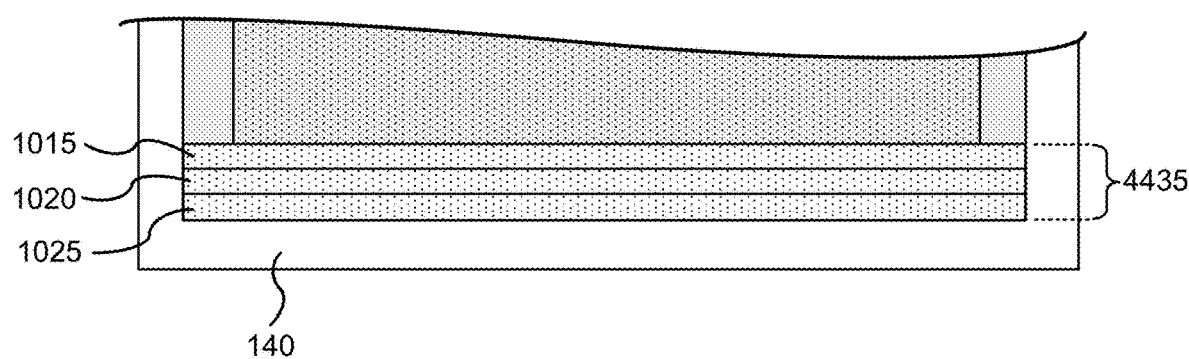

FIG. 7B depicts a cross sectional portion of an electrochromic device, 1010, of an embodiment. The electrochromic device, 1010, has a BPE 4435 formed via laser ablation of the lower TCO using varying ablation depth along a plurality of laser ablation lines 1015, 1020 and 1025, along one edge of the device. In this example, the lines are formed by overlapping laser spots along each line, but where each line uses a different overlap percentage of the individual spots. In this example, there is also overlap of the lines; however in some embodiments there is no overlap between one or more lines. FIG. 7C shows a top view of BPE 4435 (any device described herein may have a BPE as described in relation to FIGS. 7A-F) that is made from three lines 1015, 1020 and 1025. These lines each are of varying depth of ablation into the TCO relative to the other lines, but have substantially the same depth of ablation within any given line. By using varying ablation depth, e.g. using different fluence level of the laser spot, overlap in the spots or lines, pulse duration, and combinations thereof, the BPE has multiple depth profiles and accounts for problems associated with variation in film absorption during laser ablation. That is, if the laser doesn't ablate deeply enough, or ablates too deeply, there is still a sufficient amount of exposed TCO in order to make good electrical contact with the bus bar along the device edge and thus good performance and coloration front during operation of the device. In this example, the TCO is ablated progressively more deeply as the laser is moved from each line to the next, so that the BPE is progressively thinner at the outer edge and thicker at the innermost surface near the device stack. The BPE depicted in FIG. 10B shows gently sloped transitions between lines indicating that laser ablation paths were overlapping partially. The final BPE is a three-stepped construct as depicted. By using varying ablation depth, good electrical contact between the bus bar and the BPE is ensured because even if there is absorption variation, there will be complete penetration to the lower TCO by at least one of the ablation lines.

In one embodiment, laser ablation is used to remove material from at least two lines along the edge of the EC device, along each line at a different ablation depth. In one embodiment, the ablation depth is selected from at least the upper 10% of the lower TCO, at least the upper 25% of the lower TCO, at least the upper 50% of the lower TCO, and at least the upper 75% of the lower TCO.

Figure 7D:
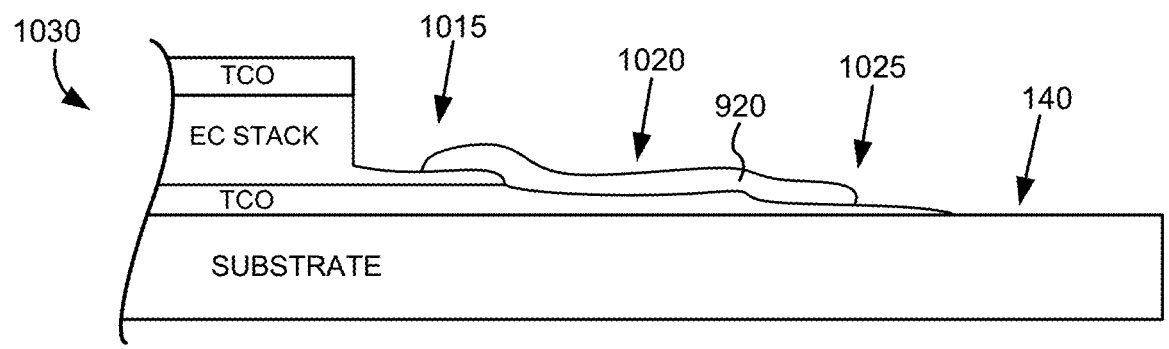
Figure 7E:
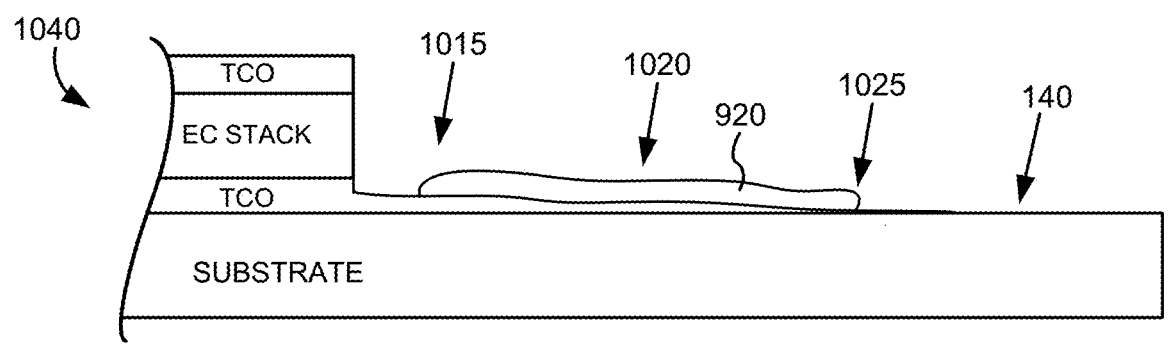

FIG. 7D depicts a cross sectional portion of an electrochromic device, 1030, of an embodiment. Referring to FIG. 7D, even if the materials above the bottom TCO vary in absorption from the calculated value, e.g. the laser ablation does not dig as deeply into the stack as calculated due to loss of absorption for some reason, since there are multiple lines at different depths, the BPE process is successful, i.e. good electrical connectivity with bus bar 920 is achieved. In the example depicted in FIG. 7D, the laser didn't ablate as deeply as calculated, e.g. line 1015 has some EC stack material remaining which would interfere with electrical contact between the BPE and a bus bar. But, lines 1020 and 1025 did penetrate down to the TCO and thus bus bar 920 makes good electrical contact with the lower TCO. FIG. 7E depicts a cross sectional portion of an electrochromic device, 1040, of an embodiment. FIG. 7E depicts the scenario where the laser penetrates more deeply than calculated, e.g. when the absorption of the material layers drifts to a more increased state than expected. In this example, line 1025 has insufficient TCO thickness to conduct electricity properly, but the remaining lines, 1015 and 1020, allow for good electrical connection with bus bar 920.

Figure 7F:
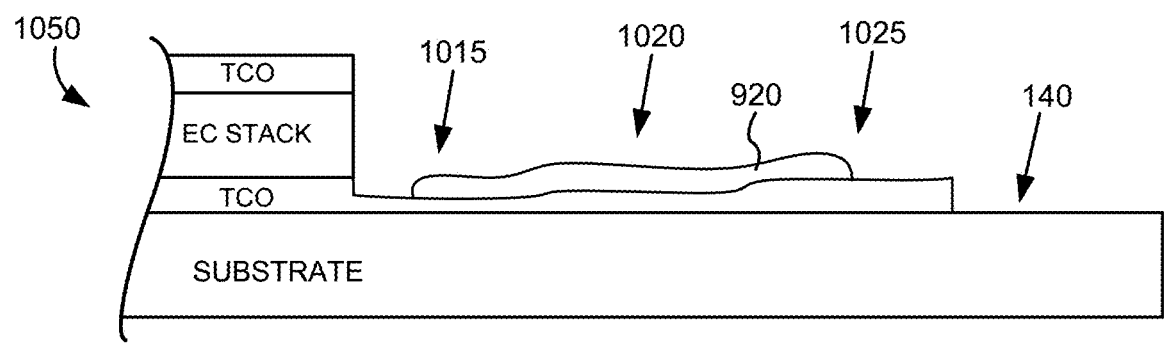

FIG. 7F depicts a cross sectional portion of an electrochromic device, 1050, of an embodiment. FIG. 7F illustrates that the varying depth of the laser lines need not be from less depth to more depth as one moves from inner portion of BPE to outer portion of BPE. In this example, the laser ablation depth is configured such that the BPE is thicker furthest from the EC device and thinnest closest to the device edge. This pattern may have advantage when, e.g., it is desirable to make absolutely sure there is no stack material between where the bus bar is fabricated on the BPE and the device stack. By penetrating more deeply into the TCO on the line (1015) proximate the EC device, this is achieved. In one embodiment, the laser is configured to progressively remove more of the underlying conductor layer in each of the plurality of scribe lines, the ablation area of each scribe line is overlapped at least partially with the ablation area of the previous scribe line, and plurality of scribe lines are fabricated with most removal of underlying conductor layer nearest to the device stack and least removal of underlying conductive layer furthest from the device stack. In one embodiment, the laser is configured to progressively remove more of the underlying conductor layer in each of the plurality of scribe lines, the ablation area of said at least two scribe lines is overlapped at least partially with the ablation area, and plurality of scribe lines are fabricated with least removal of underlying conductor layer nearest to the device stack and most removal of underlying conductive layer furthest from the device stack.

Although the varying fluence and/or overlap and/or pulse duration of laser ablation spots, lines or patterns in order to vary the ablation depth is described in reference to BPE fabrication, it can also be used to create the edge taper as described herein. Nor are these methods limited to those embodiments, e.g., they can also be used to create isolation trenches, e.g., where two or more lines are ablated at different depths to ensure proper electrical (and optionally ionic) isolation of one section of an EC device from another. In one embodiment, an L3 scribe is fabricated where two or more scribe lines are used to fabricate the L3 scribe and at least two scribe lines each have a different ablation depth, with or without overlap of the lines.

The above described fabrication methods are described in terms of rectangular optical devices, e.g. rectangular EC devices. This is not necessary, as they also apply to other shapes, regular or irregular. Also, the arrangement of overlapping device layers as well as BPE and other features may be along one or more sides of the device, depending upon the need. Other shapes and configurations are described in more detail in U.S. patent application Ser. No. 14/362,863, titled "THIN-FILM DEVICES AND FABRICATION," and filed on Jun. 4, 2014, which is incorporated by reference in its entirety herein.

In certain embodiments, the electromagnetic radiation used in various ablation operations can be provided by the same laser or by different lasers. The (laser) radiation is delivered using either optical fiber or the open beam path. The ablation can be performed from either glass side or the film side depending on the choice of the electromagnetic radiation wavelength. The energy density required to ablate the material is achieved by passing the laser beam through an optical lens. The lens focuses the laser beam to the desired shape and size, e.g., a "top hat" having the dimensions described above, in one embodiment, having an energy density of between about 0.5 J/cm$^2$ and about 4.0 J/cm$^2$. In certain cases, it may be desirable to control the fluence level of the laser. One way to control the fluence is to perform laser ablation above the focal plane, i.e., the laser beam can be defocused. In one embodiment, for example, the defocused profile of the laser beam can be a modified top hat, or "quasi top hat." By using a defocused laser profile, the fluence delivered to the surface can be increased without damaging the underlying material at the laser spot overlap region. This defocused laser profile may be used in pre-deposition operations of certain embodiments to minimize the amount of residual material left on the substrate.

Although the deletion processes of embodiments are described herein generally in terms of rectangular optical devices, other regular (e.g., circular, oval, trapezoidal, etc.) and irregular shapes can also apply. In some cases, a deletion process uses a rectangular (e.g., square) laser pattern may be used to delete material from a rectangular region. For example, the laser spot/beam may be directed to move linearly, back and forth over the surface of the device, with some uniform degree of overlap between the formed lines. In these cases, the laser lines formed are typically parallel to each other. The laser lines are either parallel or perpendicular to the edge of the device. In other cases, the deletion process may use a non-rectangular laser pattern. For example, the deletion process may use a circular laser spot to generate overlapping circles to delete material from a curved region. In this case, the laser spot is circular. In other cases, the laser spot may be rectangular. The rectangular shaped laser spot may be rotated to have an orientation that is parallel to the edge of the device of which material is being removed. In some cases, the deletion process may remove material from multiple regions along one or more sides of the optical device. These regions may be of the same shape (e.g., multiple rectangular regions) or may have different shapes (e.g., rectangular and curved) depending on the shape of the electrochromic device.

Certain aspects relate to methods of an optical device comprising one or more material layers sandwiched between a first and a second conducting layer, wherein the method comprises: (i) receiving a substrate with the first conducting layer over its work surface; (ii) removing a first width of the first conducting layer along from between about 50% and about 90% of the perimeter region of the substrate while leaving a pad of the first conducting layer coextensive with the first width about the perimeter edge of the substrate; (iii) depositing said one or more material layers of the optical device and the second conducting layer over the work surface of the substrate; and (iv) removing a second width of all the layers about substantially the entire perimeter of the substrate, wherein the depth of removal is at least sufficient to remove the first conducting layer, such that the pad of the first conducting layer is removed along with the remaining about 25% to about 50% of the first conducting layer along the perimeter region. In some of these cases, the methods further comprises (v) removing at least one portion of the second conducting layer and the one or more layers of the optical device thereunder, thereby revealing at least one exposed portion of the first conducting layer and (vi) applying a bus bar to said at least one exposed portion of the first conducting layer, wherein at least one of the first and second conducting layers is transparent. In one example of the method, said one or more material layers of the optical device and the second conducting layer are deposited over substantially the entire work surface of the substrate due to the substrate being masked about the perimeter edge by a carrier holding mechanism. In one example of the method, said one or more material layers of the optical device and the second conducting layer are deposited over substantially the entire work surface of the substrate due to the substrate being masked about the perimeter edge by a carrier holding mechanism.

In one example of the method, the first width is at a distance of between about 1 mm and about 10 mm from the outer edge of the substrate. In one example of the method, the first width is at a distance of between about 1 mm and about 5 mm from the outer edge of the substrate. In one example of the method, the first width is at a distance of about 10 mm from the outer edge of the substrate. In one example of the method, the first width is between about 1 mm and about 5 mm. In one example of the method, the first width is about 4 mm. In one example of the method, the method further comprises tapering the edge of the lower conductor layer. In one example of the method, the method further comprises applying a second bus bar to the second conductor layer. In these cases, the method may further comprise incorporating the optical device into an insulated glass unit (IGU) and/or fabricating a laminate comprising the optical device and another substrate.

In various embodiments, the operations of the methods described herein can be performed in a different order, and certain operations may be excluded or performed on fewer or different sides than mentioned. For example, in one case the process flow is as follows: perform PDLD on 3 edges of the electrochromic lite; perform a BPE operation; perform L3 isolation scribe operation; and perform transparent electrical conductor (TEC) bus bar post-deposition PDLD operation.

Although the foregoing embodiments have been described in some detail to facilitate understanding, the described embodiments are to be considered illustrative and not limiting. It will be apparent to one of ordinary skill in the art that certain changes and modifications can be practiced within the scope of the description.

What is claimed is:

1. A method of fabricating an electrochromic device having one or more layers of the electrochromic device sandwiched between a first transparent conductor layer and a second transparent conductor layer, the method comprising:
   (i) receiving a rectangular glass substrate with the first transparent conductor layer over its work surface;
   (ii) removing a first strip of the first transparent conductor layer along three sides about a perimeter of the rectangular glass substrate, wherein the first strip is inset from an outer edge of the rectangular glass substrate;
   (iii) depositing the one or more layers of the electrochromic device and the second transparent conductor layer over substantially entire work surface of the rectangular glass substrate; and
   (iv) removing a second strip at a sufficient depth to remove layers of the second transparent conductor layer, the electrochromic device and the first transparent conductor layer along substantially entire perimeter of the rectangular glass substrate.

2. The method of claim 1, wherein the second strip is of sufficient width that its inner edge coincides with or is to inside of the outer edge of the first strip.

3. The method of claim 1, further comprising removing a region of the second transparent conductor layer and the one or more layers of the electrochromic device revealing an exposed portion of the first transparent conductor layer.

4. The method of claim 3, wherein removing the region of the second transparent conductor layer and the one or more layers of the electrochromic device includes removing a portion of the first transparent conductor layer in the region.

5. The method of claim 3, further comprising applying a first bus bar to the exposed portion of the first transparent conductor layer.

6. The method of claim 5, further comprising applying a second bus bar to the second transparent conductor layer.

7. The method of claim 6, wherein the second bus bar is applied to the second transparent conductor layer on a portion that does not cover the first transparent conductor layer.

8. The method of claim 7, wherein the second bus bar is applied along an edge of the electrochromic device, opposite the first bus bar.

9. The method of claim 1, further comprising incorporating the rectangular glass substrate into an insulated glass unit, wherein the electrochromic device faces a sealed volume of the insulated glass unit.

10. The method of claim 1, wherein each of the first transparent conductor layer and the second transparent conductor layer comprise fluorinated tin oxide or indium tin oxide.

11. The method of claim 1, wherein (ii) and (iv) are performed using laser ablation.

12. The method of claim 1, wherein the one or more layers of the electrochromic device and the second transparent conductor layer are deposited over substantially entire work surface of the rectangular glass substrate due to the rectangular glass substrate being masked about the outer edge.

13. The method of claim 1, wherein the first strip is inset at a distance of between about 1 mm and about 10 mm from the outer edge of the rectangular glass substrate.

14. The method of claim 1, wherein the first strip is inset at a distance of between about 5 mm and about 10 mm from the outer edge of the rectangular glass substrate.

15. The method of claim 1, wherein the first strip is inset at a distance of about 10 mm from the outer edge of the rectangular glass substrate.

16. The method of claim 1, wherein the first strip has a width between about 1 mm and about 5 mm.

17. The method of claim 1, further comprising tapering an edge of the first transparent conductor layer along an inner edge of a portion of the first transparent conductor layer remaining after the first strip is removed, and before the one or more layers of the electrochromic device are deposited.

18. The method of claim 1, further comprising forming a laminate with the rectangular glass substrate, wherein the electrochromic device is disposed on a face of the rectangular glass substrate that is opposite a lamination adhesive used to form the laminate.

19. The method of claim 18, further comprising incorporating the laminate into an insulating glass unit.

20. The method of claim 1, wherein the electrochromic device is an all solid-state and inorganic electrochromic device.

21. The method of claim 1, wherein the rectangular glass substrate is float glass, tempered or untempered.

22. The method of claim 1, further comprising depositing a vapor barrier layer on the second transparent conductor layer prior to, or after, (iv).

23. The method of claim 1, wherein the first strip of the first transparent conductor layer is removed along at least one of the three sides to the outer edge of an adjacent side.

* * * * *